(12) United States Patent
Zanone et al.

(10) Patent No.: US 8,937,602 B2
(45) Date of Patent: Jan. 20, 2015

(54) SYSTEM AND METHOD FOR ROCKING FINGER AND STATIC FINGER DETECTION ON AN INPUT DEVICE

(75) Inventors: Jean-Daniel Zanone, Renens (CH);
Jaroslav Jirousek, Denges (CH);
Baptiste Merminod, Carrouge (CH);
Vincent Mayor, Rolle (CH)

(73) Assignee: Logitech Europe S.A., Morges (CH)

( * ) Notice: Subject to any disclaimer, the term of this patent is extended or adjusted under 35 U.S.C. 154(b) by 230 days.

(21) Appl. No.: 13/368,237

(22) Filed: Feb. 7, 2012

(65) Prior Publication Data

US 2013/0194200 A1 Aug. 1, 2013

Related U.S. Application Data

(60) Provisional application No. 61/593,856, filed on Feb. 1, 2012.

(51) Int. Cl.
*G06F 3/041* (2006.01)

(52) U.S. Cl.
USPC ............ 345/173; 345/163; 345/174; 345/175

(58) Field of Classification Search
CPC ... G06F 3/0488; G06F 3/041; G06F 3/04883; G06F 3/0485; G06F 2203/04808; G06F 2203/04806; G06F 3/017; G06F 3/0416; G06F 3/0412; G06F 3/0486; G06F 3/0414; G06F 3/044; G06F 3/04845; G06F 3/04847; G06F 1/1692; G06F 2203/04104; G06F 3/016; G06F 3/0235; G06F 3/03547; G06F 3/0487
USPC .................................................. 345/156–184
See application file for complete search history.

(56) References Cited

U.S. PATENT DOCUMENTS

| | | | | |
|---|---|---|---|---|
| 6,023,265 | A * | 2/2000 | Lee ............................... | 345/173 |
| 7,116,427 | B2 | 10/2006 | Baney et al. | |
| 7,289,102 | B2 * | 10/2007 | Hinckley et al. .............. | 345/156 |
| 8,305,357 | B2 * | 11/2012 | Liao et al. ...................... | 345/174 |
| 8,803,832 | B2 * | 8/2014 | Ohashi et al. ................. | 345/173 |
| 2003/0063064 | A1 | 4/2003 | Braun et al. | |
| 2005/0110769 | A1 | 5/2005 | DaCosta et al. | |
| 2006/0202969 | A1 | 9/2006 | Hauck | |

(Continued)

OTHER PUBLICATIONS

Non-Final Office Action for U.S. Appl. No. 13/368,232 (Oct. 3, 2013) 14 pages.

(Continued)

*Primary Examiner* — Amare Mengistu
*Assistant Examiner* — Gloryvid Figueroa-Gibson
(74) *Attorney, Agent, or Firm* — Kilpatrick Townsend & Stockton LLP

(57) ABSTRACT

A method of reducing the power consumption of an input device includes operating the input device at a first power level, detecting the presence of a touch object on a touch surface of the input device, determining that the presence of the touch object on the touch surface is static for a predetermined period of time, operating the input device at a second power level, maintaining the input device at the second power level, determining that the presence of the touch object on the touch surface is not static, and operating the input device at the first power level. In some cases, the touch object is a finger. The touch object is static if the touch object's position on the touch surface remains within a predetermined region, where the predetermined region is an area centered around the presence of the touch object on the touch surface.

24 Claims, 11 Drawing Sheets

(56) References Cited

U.S. PATENT DOCUMENTS

| | | | |
|---|---|---|---|
| 2007/0008286 A1 | 1/2007 | Theytaz et al. | |
| 2009/0066674 A1* | 3/2009 | Maharyta et al. | 345/178 |
| 2009/0135140 A1 | 5/2009 | Constantin et al. | |
| 2010/0013777 A1 | 1/2010 | Baudisch et al. | |
| 2010/0013778 A1 | 1/2010 | Liu et al. | |
| 2010/0117962 A1* | 5/2010 | Westerman et al. | 345/163 |
| 2010/0328210 A1 | 12/2010 | Jeng et al. | |
| 2011/0012856 A1* | 1/2011 | Maxwell et al. | 345/173 |
| 2011/0043491 A1 | 2/2011 | Oh | |
| 2011/0109553 A1* | 5/2011 | Tsao et al. | 345/163 |
| 2011/0187651 A1 | 8/2011 | Whitlow et al. | |
| 2011/0291924 A1 | 12/2011 | Raynor | |
| 2012/0032894 A1* | 2/2012 | Parivar et al. | 345/173 |
| 2012/0050211 A1 | 3/2012 | King et al. | |
| 2013/0069900 A1* | 3/2013 | Yang | 345/173 |
| 2013/0271416 A1* | 10/2013 | Liu | 345/173 |

OTHER PUBLICATIONS

Non-Final Office Action for U.S. Appl. No. 13/368,239 (Feb. 5, 2014) 24 pages.
Final Office Action for U.S. Appl. No. 13/368,232 (Jan. 31, 2014) 21 pages.
Non-Final Office Action for U.S. Appl. No. 13/368,232 (May 22, 2014) 14 pages.
Final Office Action for U.S. Appl. No. 13/368,239 (Jul. 17, 2014) 28 pages.
Advisory Action for U.S. Appl. No. 13/368,239 (Sep. 9, 2014) 3 pages.
Notice of Allowance for U.S. Appl. No. 13/368,239 (Oct. 24, 2014) 12 pages.
Final Office Action for U.S. Appl. No. 13/368,232 (Nov. 5, 2014) 16 pages.

* cited by examiner

Spurious Signal Detection

Mouse Lift

500

600

Rocking Finger

SYSTEM AND METHOD FOR ROCKING FINGER AND STATIC FINGER DETECTION ON AN INPUT DEVICE

CROSS-REFERENCES TO RELATED APPLICATIONS

The present non-provisional application claims benefit under 35 U.S.C. §119 of U.S. Provisional Patent Application No. 61/593,856, filed on Feb. 1, 2012, and entitled "Methods and Systems for a Multi-Sensor Input Device," which is herein incorporated by reference in its entirety for all purposes. Furthermore, the following regular U.S. patent applications are being filed concurrently, and the entire disclosure of the other applications are incorporated by reference into this application for all purposes:

Application Ser. No. 13/368,232, filed Feb. 7, 2012, entitled "SYSTEM AND METHOD FOR CALIBRATING AN INPUT DEVICE"; and Application Ser. No. 13/368,239, filed Feb. 7, 2012, entitled "SYSTEM AND METHOD FOR SPURIOUS SIGNAL DETECTION AND COMPENSATION ON AN INPUT DEVICE".

BACKGROUND OF THE INVENTION

Wireless control devices, including computer mice, provide a means for interacting with a computer. As an example, a mouse can detect two-dimensional motion relative to its supporting surface and be used to move a cursor across a computer screen and provide for control of a graphical user interface. Buttons are typically provided on wireless control devices to enable a user to perform various system-dependent operations. Despite the developments related to wireless control devices, there is a need in the art for improved methods and systems related to such control devices.

SUMMARY OF THE INVENTION

According to an embodiment of the present invention, a method of calibrating an input device is provided. The method includes powering up the input device, which includes a touch sensor, and placing the touch sensor in a normal mode of operation. The input device scans the touch sensor to detect a user input data and determines whether the user input is detected within a predetermined time period. If no user input is received during the predetermined time period, the method includes placing the touch sensor in a calibration mode of operation. The method further includes performing a calibration process for the touch sensor, and returning the touch sensor to the normal mode of operation. In some embodiments, the input device further comprises one or more additional sensors. The method can further include scanning the one or more additional sensors to detect the user input. Typically, the predetermined time period is between 15 to 45 seconds, however other predetermined time periods can be used as would be appreciated by one of ordinary skill in the art with the benefit of this disclosure. In certain embodiments, the calibration process is performed a single time after powering up the input device.

The one or more additional sensors can include one or more of an optical sensor, a touch sensor, an accelerometer or gyroscope, each operable to provide the user input data. In some embodiments, the optical sensor is operable to provide at least one of X-Y movement data or lift data, where the lift data can identify whether the input device has been lifted off of a surface. In further embodiments, the touch sensor is operable to provide at least one of touch data or gesture data. In yet further embodiments, the accelerometer or gyroscope can be operable to provide movement or orientation data.

Further embodiments include a non-transitory computer readable medium comprising a plurality of computer-readable instructions tangibly embodied on the computer-readable storage medium, which, when executed by a data processor, provides a method of calibration. The plurality of instructions comprise instructions that cause the data processor to power up an input device, instructions that cause the data processor to place the touch sensor in a normal mode of operation, instructions that cause the data processor to scan the touch sensor to detect a user input, instructions that cause the data processor to determine that the user input is not detected within a predetermined time period, and instructions that cause the data processor to place the touch sensor in a calibration mode of operation. In further embodiments, the method can further include instructions that cause the data processor to perform a calibration process for the touch sensor, and return the touch sensor to the normal mode of operation. In some embodiments, the input device further comprises one or more additional sensors. The method can further include instructions that cause the data processor to scan the one or more additional sensors to detect the user input. Typically, the predetermined time period is between 15 to 45 seconds, however other predetermined time periods can be used as would be appreciated by one of ordinary skill in the art with the benefit of this disclosure. In certain embodiments, the calibration process is performed a single time after powering up the input device.

The one or more additional sensors can include one or more of an optical sensor, a touch sensor, an accelerometer or gyroscope, each operable to provide the user input data. In some embodiments, the optical sensor is operable to provide at least one of X-Y movement data or lift data, where the lift data can identify whether the input device has been lifted off of a surface. In further embodiments, the touch sensor is operable to provide at least one of touch data or gesture data. In yet further embodiments, the accelerometer or gyroscope can be operable to provide movement or orientation data.

According to an embodiment of the invention, a system for calibrating an input device includes a processor and a touch sensor coupled to the processor. The processor is configured to calibrate the touch sensor after a predetermined period of no user activity on the touch sensor. The system can include one or more additional sensors, where the processor is further configured to scan the one or more additional sensors to detect the user input. In some embodiments, the processor is further configured to calibrate the touch sensor after the predetermined period of no user activity on the touch sensor and the one or more additional sensors. The predetermined period can be between 15 and 45 seconds, although other ranges and values can be applied.

Further embodiments include an input device that include a processor and a non-transitory computer-readable storage medium comprising a plurality of computer-readable instructions tangibly embodied on the computer-readable storage medium, which, when executed by the processor, process user inputs, the plurality of instructions including instructions that cause the data processor to provide a list of a plurality of input gestures, where each of the plurality of input gestures are associated with a default threshold value of a first set of threshold values and a second threshold value of a second set of threshold values. The method further includes instructions that cause the data processor to receive at least one of a plurality of movements or one of the plurality of input gestures as a user input. The method further includes instructions that cause the data processor to determine, using the processor, that the input device is placed in one of a plurality of predetermined conditions and apply the second threshold value based, at least in part, on the one of the plurality of predetermined conditions. In some cases, the user inputs can be received via a touch sensor. In certain embodiments, the second set of threshold values is different than the first set of threshold values.

In one non-limiting embodiment, the plurality of predetermined conditions includes one or more of a lift detection, a speed threshold detection, and a button press detection. The instructions that cause the data processor to determine that the input device is placed in a predetermined condition of lift detection can further include instructions that cause the data processor to receive an input signal from an optical sensor of the input device operating on a surface and determine whether the input device has been lifted off the surface based, at least in part, on the input signal from the optical sensor. In further embodiments, the instructions that cause the data processor to determine that the input device is placed in a predetermined condition of lift detection can further include instructions that cause the data processor to receive an input signal from one or more of a gyroscope or accelerometer of the input device operating on a surface and determine whether the input device has been lifted off the surface based, at least in part, on the input signal from the one or more of a gyroscope or accelerometer. In yet further embodiments, the instructions that cause the data processor to determine that the input device is placed in a predetermined condition of lift detection can further include instructions that cause the data processor to receive an input signal from two or more of an optical sensor, gyroscope, or accelerometer of the input device operating on a surface and determine whether the input device has been lifted off the surface based, at least in part, on the two or more input signals from the optical sensor, gyroscope, or accelerometer. In one non-limiting embodiment, the second set of threshold values is twice the magnitude of the first set of threshold values.

In certain embodiments, the instructions that cause the data processor to determine that the input device is placed in a predetermined condition of speed threshold detection can further include instructions that cause the data processor to receive an input signal from an optical sensor and determine whether the input device is moving at a speed greater than a predetermined speed threshold based, at least in part, on the input signal from the optical sensor. In further embodiments, the instructions that cause the data processor to determine that the input device is placed in a predetermined condition of speed threshold detection can further include instructions that cause the data processor to receive an input signal from one or more of a gyroscope or accelerometer to determine whether the input device is moving at a speed greater than a predetermined speed threshold based, at least in part, on the input signal from the one or more of a gyroscope or accelerometer. In yet further embodiments, the instructions that cause the data processor to determine that the input device is placed in a predetermined condition of speed threshold detection can further include instructions that cause the data processor to receive an input signal from two or more of an optical sensor, a gyroscope, or an accelerometer and determine whether the input device is moving at a speed greater than a predetermined speed threshold based, at least in part, on the input signals from the two or more of an optical sensor, gyroscope, or accelerometer. In some cases the predetermined speed threshold is equal to or greater than 2 inches per second.

In some embodiments, the instructions that cause the data processor to determine that the input device is placed in a predetermined condition of button press detection can further include instructions that cause the data processor to determine that a button is pressed on the input device.

In further embodiments, an input device includes a processor and a touch sensor coupled to the processor, where the processor is configured to detect a gesture made by a touch object on the touch sensor, where a first threshold value is associated with the gesture during a normal operating condition of the input device, and a second threshold value is associated with the gesture during a predetermined condition of the input device, where the first and second threshold values are different values. In some cases, the predetermined condition includes at least one of a lift detection, a speed threshold detection, or a button press detection. The input device can further include one or more additional sensors coupled to the processor, the one or more additional sensors including at least one of an optical sensor, a gyroscope, or an accelerometer, where the processor is configured to detect whether the input device is lifted off of a surface based on an input from the one or more additional sensors.

In yet further embodiments, the input device can include one or more additional sensors coupled to the processor, the one or more additional sensors including at least one of an optical sensor, a gyroscope, or an accelerometer, where the processor is configured to detect whether the input device is moving at a speed greater than a predetermined speed threshold based on an input from the one or more additional sensors. The input device can further include a button coupled to the processor, wherein the processor is configured to detect a button press of a button on the input device. In certain embodiments, the touch object is a finger.

Certain embodiments of the invention include a method of detecting an input gesture on a touch sensor of an input device where the method includes receiving an input gesture made by a touch object on the touch sensor, applying a first threshold value to the input gesture during a normal operating condition of the input device, and applying a second threshold value to the input gesture during a predetermined condition of the input device, wherein the first and second threshold values are different values. The predetermined condition can include at least one of a lift detection, a speed threshold detection, or a button press detection. In some cases, input device further includes one or more additional sensors including at least one of an optical sensor, a gyroscope, or an accelerometer, where the method further comprises detecting the lift condition based on an input from the one or more additional sensors. In other cases, the input device further includes one or more additional sensors including at least one of an optical sensor, a gyroscope, or an accelerometer, wherein the method further comprises detecting whether the input device is moving at a speed greater than a predetermined speed threshold based on an input from the one or more additional sensors. Some embodiments may further comprise detecting a button press of a button on the input device, where the touch object is a finger.

Certain embodiments of the present invention include a method of improving an accuracy of touch detection on an input device, where the method includes detecting, at a first time, contact of a touch object with a touch surface of the input device and determining a first location of the contact of the touch object with the touch surface. The first location is represented as a first set of coordinates on a two-dimensional axis (e.g., two-dimensional plane) and identifies an approximation of a length and width of the first location of the touch object with the touch surface. The method further includes detecting, at a second time, contact of the touch object with the touch surface of the input device, with the second time occurring after the first time, and determining a second location of the contact of the touch object with the touch surface, where the second location is represented as a second set of coordinates on the two dimensional plane. The second set of coordinates identifies an approximation of a length and width of the second location of the touch object with the touch surface. The method further includes comparing the first set of coordinates with the second set of coordinates and determining whether the touch object has moved or is rocking based on the comparison between the first and second set of coordinates. In certain embodiments, the touch object is a finger, where the finger can move relative to the touch surface or rock in a generally or substantially stationary position. In some cases, the two-dimensional plane is an X-Y plane.

In certain embodiments, the method further includes comparing the first set of coordinates with the second set of coordinates, which can include determining a first reference point and a second reference point within the first set of coordinates, where the first reference point and the second reference point are diagonally opposed from each other. The method further includes determining a third reference point and a fourth reference point within the second set of coordinates, where the third reference point and the fourth reference point are diagonally opposed from each other. In some embodiments, the method further includes determining that the touch object is rocking if the first reference point of the first set of coordinates and the third reference point of the second set of coordinates are within a predetermined distance from one another. In further embodiments, the method can further include determining that the touch object is rocking if the second reference point of the first set of coordinates and the fourth reference point of the second set of coordinates are within a predetermined distance from one another.

Certain embodiments of the present invention include a non-transitory computer-readable storage medium comprising a plurality of computer-readable instructions tangibly embodied on the computer-readable storage medium, which, when executed by a data processor, provides a method of improving an accuracy of touch detection on a touch sensor on an input device, the plurality of instructions comprising instructions that cause the data processor to detect, at a first time, contact of a touch object with a touch surface of the input device. The method can further include instructions that cause the data processor to determine a first location of the contact of the touch object with the touch surface, where the first location is represented as a first set of coordinates on a two-dimensional plane, and where the first set of coordinates identifies an approximation of a length and width of the first location of the touch object with the touch surface. The method can further include instructions that cause the data processor to detect, at a second time, contact of the touch object with the touch surface of the input device, the second time occurring after the first time and determine a second location of the contact of the touch object with the touch surface, where the second location is represented as a second set of coordinates on the two dimensional plane, and where the second set of coordinates identifies an approximation of a length and width of the second location of the touch object with the touch surface. In further embodiments, the method includes instructions that cause the data processor to compare the first set of coordinates with the second set of coordinates and determine whether the touch object has moved or is a rocking finger based on the comparison between the first and second set of coordinates. In some cases, the touch object is a finger, where the finger can move relative to the touch surface or rock in a generally or substantially stationary position. The two-dimensional plane can be an X-Y plane.

In certain embodiments, the instructions that cause the data processor to compare the first set of coordinates with the second set of coordinates can include instructions that cause the data processor to determine a first reference point and a second reference point within the first set of coordinates, where the first reference point and the second reference point are diagonally opposed from each other. The method can further include instructions that cause the data processor to determine a third reference point and a fourth reference point within the second set of coordinates, where the third reference point and the fourth reference point are diagonally opposed from each other. The method further includes instructions that cause the data processor to determine that the touch object is rocking if the first reference point of the first set of coordinates and the third reference point of the second set of coordinates are within a predetermined distance from one another.

Some embodiments of the present invention further comprise instructions that cause the data processor to determine that the touch object is rocking if the second reference point of the first set of coordinates and the fourth reference point of the second set of coordinates are within a predetermined distance from one another.

In further embodiments of the present invention, a method of reducing the power consumption of an input device includes operating the input device at a first power level, detecting the presence of a touch object on a touch surface of the input device, determining that the presence of the touch object on the touch surface is static for a predetermined period of time, operating the input device at a second power level, maintaining the input device at the second power level, determining that the presence of the touch object on the touch surface is not static, and operating the input device at the first power level. In some cases, the touch object is a finger. In some embodiments, the touch object is static if the touch object's position on the touch surface remains within a predetermined region, where the predetermined region is an area centered around the presence of the touch object on the touch surface. The area centered around the presence of the touch object on the touch surface can be circular and of a predetermined radius. Alternatively, the area centered around the presence of the touch object on the touch surface is rectangular and of a predetermined height and width. In certain configurations, the area centered around the presence of the touch object on the touch surface includes a circular area and rectangular area superimposed upon each other, wherein the circular area is of a predetermined radius and the rectangular area is of a predetermined height and width. The second power level can be a lower power than the first power level. In some cases, the method is performed by firmware controlled by a processor.

Certain embodiments of the present invention include a non-transitory computer-readable storage medium comprising a plurality of computer-readable instructions tangibly embodied on the computer-readable storage medium, which, when executed by a data processor, provides a method of reducing the power consumption of an input device. The plurality of instructions can include instructions that cause the data processor to operate the input device at a first power level, detect the presence of a touch object on a touch surface of the input device, determine that the presence of the touch object on the touch surface is static for a predetermined period of time, operate the input device at a second power level, and maintain the input device at the second power level. The plurality of instructions can further include instructions that cause the data processor to determine that the presence of the touch object on the touch surface is not static, and operate the input device at the first power level. In some cases, the touch object is a finger. The touch sensor can be static if the touch object's position on the touch surface remains within a predetermined region. The predetermined region can be an area centered around the presence of the touch object on the touch surface. In some cases, the area centered around the presence of the touch object on the touch surface is circular and of a predetermined radius. In some cases the area centered around the presence of the touch object on the touch surface is a rectangular and of a predetermined height and width. Alternatively, the area centered around the presence of the touch object on the touch surface includes a circular area and rectangular area superimposed upon each other, wherein the circular area is of a predetermined radius and the rectangular area is of a predetermined height and width. In some cases, the second power level can be a lower power than the first power level, or vice versa. The method can be performed by firmware controlled by a processor.

According to certain embodiments, an input device includes a processor and a touch sensor coupled to the processor, where the processor is configured to detect a first location of a touch object on the touch sensor at a first time and a second location of the touch object on the touch sensor at a second time, where the processor is further configured to determine whether the touch object is moving or rocking. In some cases, the first location includes a first reference point and the second location includes a second reference point, and wherein the processor further determines whether the touch object is moving or rocking based on a positional relationship between the first and second locations. The first location can comprise a first set of coordinates and the second location can comprise a second set of coordinates. In some embodiments, the processor is configured to determine whether the touch object is moving or rocking based, at least in part, on the first and second set of coordinates. In some embodiments of the invention, the processor is further configured to operate the input device at a first power level, where the processor is further configured to determine if the touch object on the touch sensor is static for a predetermined period of time. In some cases, the processor is further configured to operate and maintain the input device at a second power level while the touch object remains static on the touch sensor.

According to some embodiments, a method of improving an accuracy of touch detection on an input device includes detecting, at a first time, a first location of a touch object contacting a touch surface of the input device, detecting, at a second time, a second location of the touch object contacting the touch surface of the input device, and determining whether the touch object is rocking or has moved. In some cases, the method includes determining whether the touch object is rocking or has moved based, at least in part, on a relationship between the first and second locations. The first location can include a first set of coordinates and the second location can include a second set of coordinates. In further embodiments, the method can further include operating the input device at a first power level, detecting the presence of the touch object on the touch surface of the input device, determining that the presence of the touch object on the touch surface is static after a predetermined period of time, and operating and maintaining the input device at a second power level while the touch object remains static on the touch surface.

DETAILED DESCRIPTION OF THE INVENTION

Embodiments of the invention are generally directed to systems and methods for operating a multi-sensor computer input device.

In an embodiment of the present invention, a method includes improving an accuracy of touch detection on an input device. The method includes detecting, at a first time, contact of a touch object with a touch surface of the input device and determining a first location of the contact of the touch object with the touch surface. The first location is represented as a first set of coordinates on a two-dimensional plane and identifies an approximation of a length and width of the first location of the touch object with the touch surface. The method further includes detecting, at a second time, contact of the touch object with the touch surface of the input device, with the second time occurring after the first time, and determining a second location of the contact of the touch object with the touch surface, where the second location is represented as a second set of coordinates on the two dimensional plane. The second set of coordinates identifies an approximation of a length and width of the second location of the touch object with the touch surface. The method further includes comparing the first set of coordinates with the second set of coordinates and determining whether the touch object has moved or is rocking based on the comparison between the first and second set of coordinates. In certain embodiments, the touch object is a finger, where the finger can move relative to the touch surface or rock in a generally stationary position. In some cases, the two-dimensional plane is an X-Y plane.

Another embodiment of the invention involves a method of reducing the power consumption of an input device. The method includes operating the input device at a first power level, detecting the presence of a touch object on a touch surface of the input device, determining that the presence of the touch object on the touch surface is static for a predetermined period of time, operating the input device at a second power level, maintaining the input device at the second power level, determining that the presence of the touch object on the touch surface is not static, and operating the input device at the first power level. In some cases, the touch object is a finger. In some embodiments, the touch object is static if the touch object's position on the touch surface remains within a predetermined region, where the predetermined region is an area centered around the presence of the touch object on the touch surface.

Figure 1:
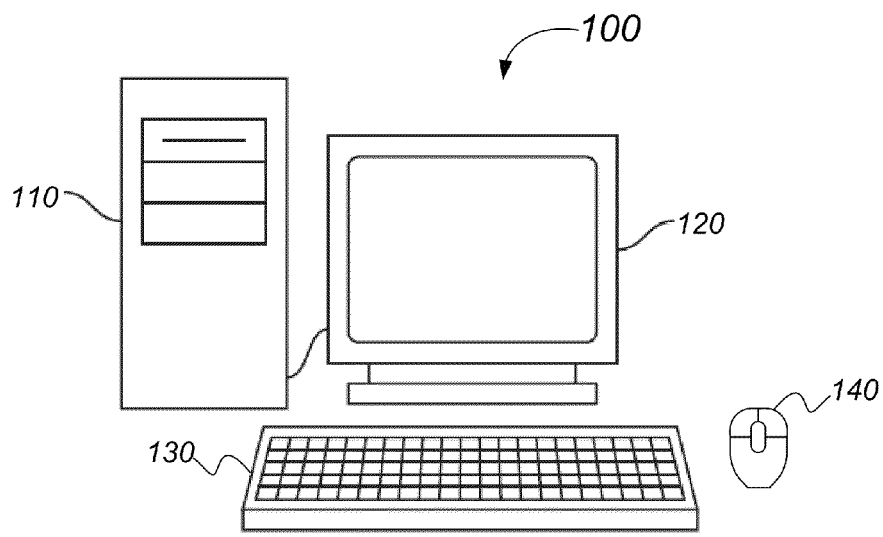
FIG. 1 is a simplified schematic diagram of a computer system according to an embodiment of the present invention.

FIG. 1 is a simplified schematic diagram of a computer system 100 according to an embodiment of the present invention. Computer system 100 includes a computer 110, a monitor 120, a keyboard 130, and an input device 140. In one embodiment, the input device 140 is a multi-sensor input device 140. For computer system 100, the input device 140 and the keyboard are configured to control various aspects of computer 110 and monitor 120. In some embodiments, the input device 140 is configured to provide control signals for movement detection, touch detection, gesture detection, lift detection, orientation detection, spurious signal detection, calibration methods, power management methods, and a host of additional features that include, but are not limited to scrolling, cursor movement, selection of on screen items, media control, web navigation, presentation control, and other functionality for computer 110. Computer 110 may include a machine readable medium (not shown) that is configured to store computer code, such as mouse driver software, keyboard driver software, and the like, where the computer code is executable by a processor (not shown) of the computer 110 to affect control of the computer 110 by the input device 140 and keyboard 130. It should be noted that the input device 140 may be referred to as a mouse, input device, input/output (I/O) device, user interface device, control device, a multi-sensor input device, a multi-sensor mouse, and the like.

Figure 2:
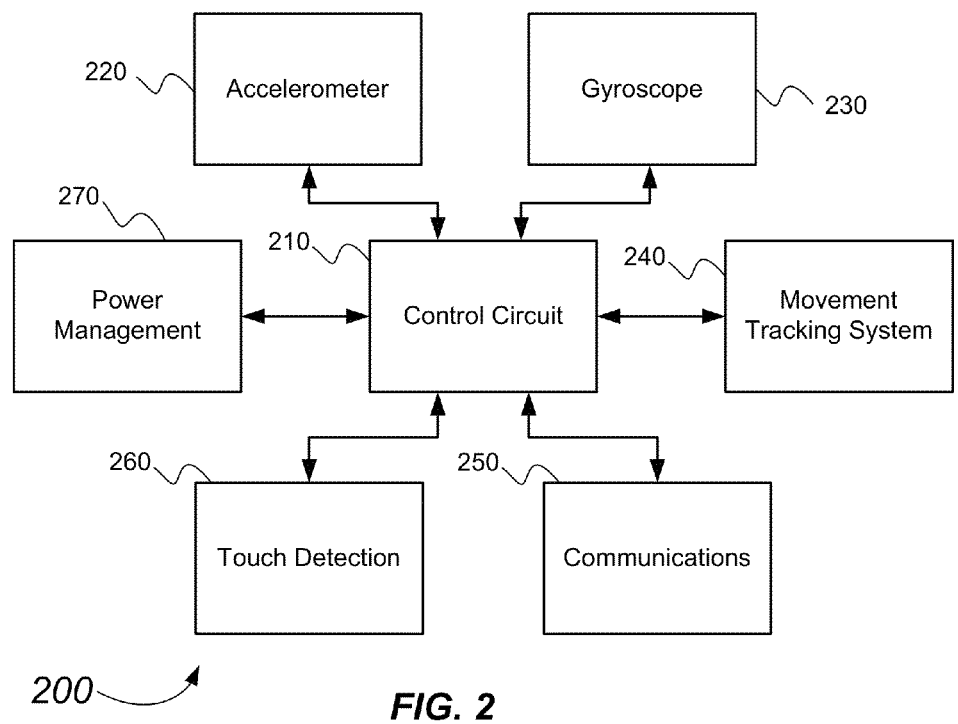
FIG. 2 is a simplified block diagram of a system configured to operate the multi-sensor input device according to an embodiment of the invention.

FIG. 2 is a simplified block diagram of a system 200 configured to operate the multi-sensor input device 140, according to an embodiment of the invention. The system 200 includes a control circuit 210, one or more accelerometers 220, one or more gyroscopes 230, a movement tracking system 240, a communications system 250, touch detection system 260, and power management block 270. Each of the system blocks 220-270 are in electrical communication with the control circuit 210. System 200 may further include additional systems that are not shown or discussed to prevent obfuscation of the novel features described herein.

In certain embodiments, the control circuit 210 comprises one or more microprocessors (μCs) and is configured to control the operation of system 200. Alternatively, the control circuit 210 may include one or more microcontrollers (MCUs), digital signal processors (DSPs), or the like, with supporting hardware/firmware (e.g., memory, programmable I/Os, etc.), as would be appreciated by one of ordinary skill in the art with the benefit of this disclosure. Alternatively, MCUs, μCs, DSPs, and the like, may be configured in other system blocks of system 200. For example, the touch detection system 260 may include a local microprocessor to execute instructions relating to a two-dimensional touch surface (not shown). In some embodiments, multiple processors may provide an increased performance in system 200 speed and bandwidth. It should be noted that although multiple processors may improve system 200 performance, they are not required for standard operation of the embodiments described herein. The control circuit 210 and/or associated firmware or software perform the various methods of calibration, spurious signal detection, rocking finger detection, and power management functions (in conjunction with power management block 270), as further described below.

In certain embodiments, the accelerometers 220 are electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers. The accelerometers 220 can further determine if the input device 140 has been lifted off of a surface and provide movement data that can include the velocity, physical orientation, and acceleration of the input device 140.

A gyroscope 230 is a device configured to measure the orientation of the multi-sensor input device 140 and operates based on the principles of the conservation of angular momentum. In certain embodiments, the one or more gyroscopes 230 in system 200 are micro-electromechanical (MEMS) devices configured to a detect a certain rotation of the multi-sensor input device 140. The system 200 may optionally comprise 2-axis magnetometers in lieu of, or in combination with, the one or more gyroscopes 230. The gyroscope 230 (and/or magnetometers) can further determine if the input device 140 has been lifted off of a surface and provide movement data that can include the physical orientation of the input device 140.

The movement tracking system 240 is configured to track a movement of the multi-sensor input device 140, according to an embodiment of the invention. In certain embodiments, the movement tracking system 240 uses optical sensors such as light-emitting diodes (LEDs) or an imaging array of photodiodes to detect movement of the multi-sensor input device 140 relative to an underlying surface. The multi-sensor input device 140 may optionally comprise movement tracking hardware that utilizes coherent (laser) light. In certain embodiments, one or more optical sensors are disposed on the bottom side of multi-sensor input device 140 (not shown). The movement tracking system 240 can provide positional data (e.g., X-Y coordinate data) or lift detection data. For example, an optical sensor can determine when a user lifts the input device 140 off of a surface and send that data to the control circuit 210 for further processing. Alternative embodiments may use other movement tracking sensors (e.g., MEMS devices) as would be appreciated by one of ordinary skill in the art with the benefit of this disclosure.

The communications system 250 is configured to provide wireless communication with the computer 110, according to an embodiment of the invention. In certain embodiments, the communications system 250 is configured to provide radio-frequency (RF) communication with other wireless devices. Alternatively, the communications system 250 can wirelessly communicate using other wireless communication protocols including, but not limited to, Bluetooth and infra-red wireless systems. The system 200 may optionally comprise a hardwired connection to the computer 110. For example, the multi-sensor input device 140 can be configured to receive a Universal Serial Bus (USB) cable to provide electronic communication with external devices. Other embodiments of the invention may utilize different types of cables or connection protocol standards to effectuate a hardwired communication with outside entities. In one non-limiting example, a USB cable can be used to provide power to the multi-sensor input device 140 to charge an internal battery (not shown) and simultaneously support data communication between the system 200 and the computer 110.

The touch detection system 260 is configured to detect a touch or touch gesture on one or more touch surfaces on the multi-sensor input device 140, according to an embodiment of the present invention. The touch detection system 260 can include one or more touch sensitive surfaces or touch sensors. Touch sensors generally comprise sensing elements suitable to detect a signal such as direct contact, electromagnetic or electrostatic fields, or a beam of electromagnetic radiation. A touch sensor may be configured to detect at least one of the changes in the received signal, the presence of a signal, or the absence of a signal. Further, a touch sensor may include a source for emitting the detected signal, or the signal may be generated by a secondary source. Touch sensors may be configured to detect the presence of an object at a distance from a reference zone or point, contact with a reference zone or point, or a combination thereof. Touch sensors may be configured to detect certain types of objects (objects with certain properties), and not other types of objects. Touch sensors may also be configured to provide a first response when a first type of object is detected, and a second type of response when a second type of object is detected. Similarly, touch sensors may be configured to provide first response with a first type of detection, and a second response with a second type of detection. For example, some touch sensors may operate in different power modes when not actively used. To illustrate, a proximity detection may prompt a device to switch from a sleep mode (e.g., very low power mode) to a low-activity mode of operation. A direct signal detection may prompt a device to switch from a low-activity mode to an active mode (e.g., normal operating power mode). These types of power switching schemes and others, as described herein, can improve power efficiency of the input device 140. Some power saving methods are further described below with respect to FIGS. 9A-10.

Various technologies can be used for touch and/or proximity sensing. Examples of such technologies include, but are not limited to, resistive (e.g., standard air-gap 4-wire based, based on carbon loaded plastics which have different electrical characteristics depending on the pressure (FSR), interpolated FSR, etc.), capacitive (e.g., surface capacitance, self capacitance, mutual capacitance, etc.), optical (e.g., infrared light barriers matrix, laser based diode coupled with photo-detectors that could measure the time of flight of the light path, etc.), acoustic (e.g., piezo-buzzer coupled with some microphones to detect the modification of the wave propagation pattern related to touch points, etc.), etc.

In certain embodiments, the multi-sensor input device 140 has two-dimensional (2D) touch detection capabilities (e.g., x-axis and y-axis movement). Certain embodiments can include touch sensors on the top portion of the input device 140. Other embodiments may include touch sensors located on multiple locations of the input device that may depend on the design of the input device or ergonomic considerations. The multi-sensor input device 140 may optionally comprise surfaces with a one-dimensional touch detection system disposed thereon.

The power management system 270 of system 200 is configured to manage power distribution, recharging, power efficiency, and the like for the multi-sensor input device 140. According to some embodiments, power management system 270 includes a battery (not shown), a USB based recharging system for the battery (not shown), power management devices (e.g., low-dropout voltage regulators—not shown), an on/off button, and a power grid within system 200 to provide power to each subsystem (e.g., accelerometers 220, gyroscopes 230, etc.). In other embodiments, the functions provided by power management system 270 may be incorporated in the control circuit 210.

Input Device Calibration

Figure 3:
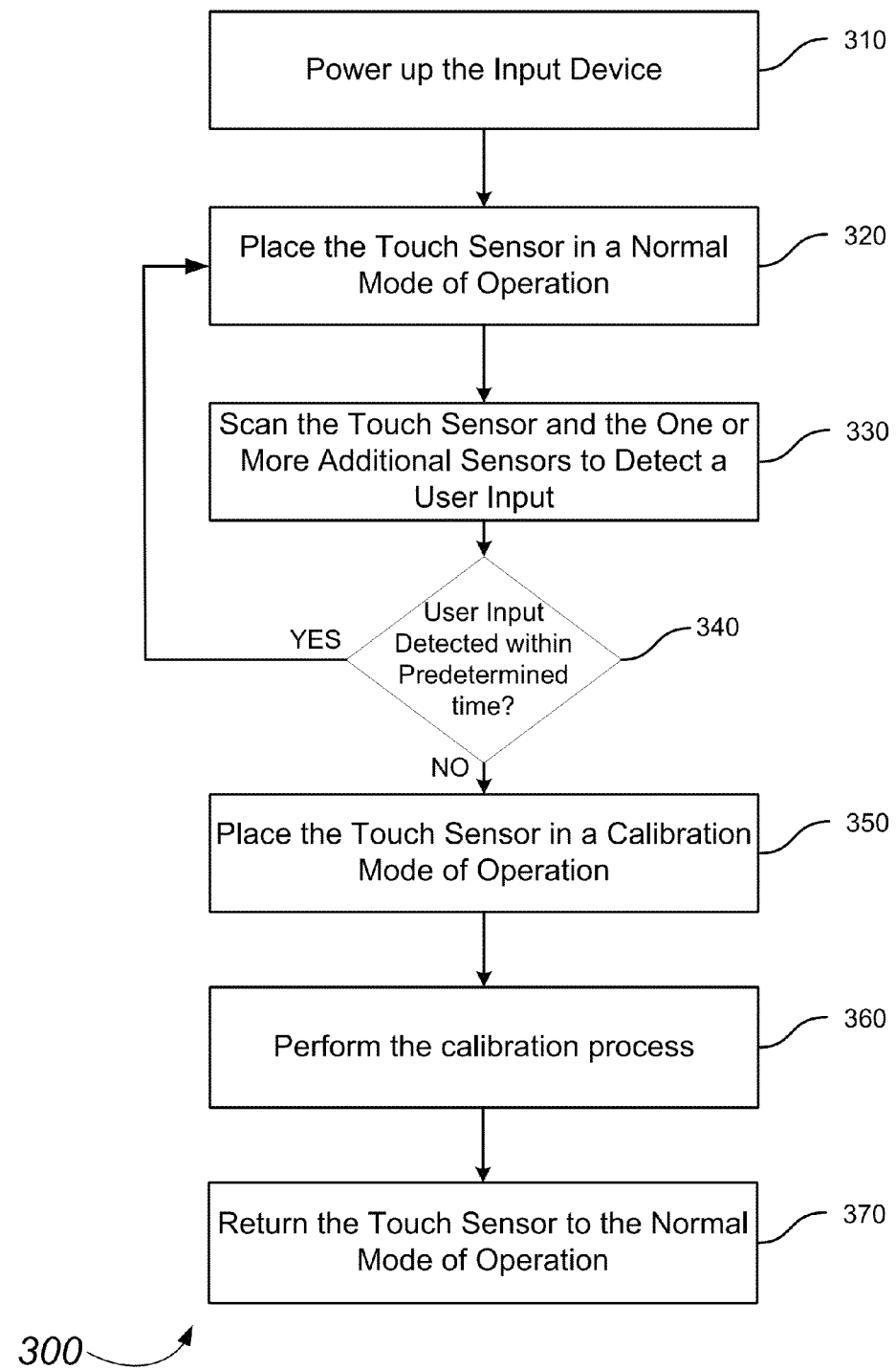
FIG. 3 is a simplified flow diagram illustrating a method for calibrating a touch sensor according to an embodiment of the invention.

FIG. 3 is a simplified flow diagram illustrating a method 300 for calibrating a touch sensor according to an embodiment of the invention. The method 300 is performed by processing logic that may comprise hardware (circuitry, dedicated logic, etc.), software (such as is run on a general purpose computing system or a dedicated machine), firmware (embedded software), or any combination thereof. In one embodiment, the method 900 is performed by system 200 of FIG. 2.

Referring to FIG. 3, the method 300 for calibrating a touch sensor includes powering up the input device 140 (310). Powering up the input device 140 can include manually switching on an on/off button from the "off" position to the "on" position. Alternatively, powering up the input device 140 may include a soft power up. For example, the input device 140 may be in a sleep mode of operation and a movement, button press, or other user input can cause the input device 140 to return to an active state (e.g., normal power state). Once the input device is powered up, the touch sensor is placed in a "normal" mode of operation (320). Typically, the normal mode of operation is a power state where the touch sensor operates under normal operating conditions. In some cases, the touch circuit may be operating in a "normal" mode of operation when each system block of system 200 (e.g., control circuit 210, communications block 250, etc.) is fully powered. In other cases, the touch sensor may be in a "normal" mode of operation when only some of the system blocks of system 200 are powered up. In yet other cases, the power management system 270 may be operating at a lower power, higher efficiency state, however in each of these embodiments, the touch sensor (e.g., touch detection block 260) at (320) is operating in a normal mode of operation.

The system 200 scans the touch sensor and one or more additional sensors to detect a user input (330). For example, the touch sensor may detect the proximity of a user input device (e.g., finger or stylus), or a direct touch to the touch sensor. The one or more additional sensors can include movement detection sensors (e.g., optoelectronics, LEDs, gyroscopes, magnetometers, accelerometers, etc.), buttons, or other type of input sensor as would be appreciated by one of ordinary skill in the art with the benefit of this disclosure. The movement detection sensors may include user data that defines movement of the input device 140 on an X-Y plane (e.g., Cartesian coordinate system). Accelerometers, gyroscopes, or magnetometers may provide data regarding the orientation, velocity, acceleration, or direction movement of the input device 140. Typically, a user input can include any data regarding any movement of the input device 140 in three-dimensional space or any interaction with the touch sensor(s). Some interactions with the touch sensor may include button presses, swipes, double taps, and the like.

At (340), the control circuit 210 determines whether a user input has been detected within a predetermined time period. In some embodiments, the predetermined time period is 30 seconds. The predetermined time period can be any desired amount of time (e.g., 5 seconds, 1 minute, etc.) as required. As described above, a user input can include any input signal received by the control circuit 210 from any of the touch sensor, gyroscope, accelerometer, and the like. If the control circuit 210 does detect a user input within the predetermined time period, then the method returns to (320) and keeps the touch sensor in a normal mode of operation. According to certain embodiments, if the control circuit 210 does not detect a user input within the predetermined time period, then the method 300 continues to (350). It should be noted that although the control circuit 210 may generate and track a timing signal, other system blocks of system 200 (or not shown) can perform the determining whether the user input is detected within the predetermined time.

Referring back to the method 300, once the control circuit 210 determines that a user input is not detected for the predetermined period of time (340), the touch sensor is placed in a calibration mode of operation (350). In the calibration mode of operation, the touch sensor undergoes a calibration process (e.g., calibration subroutine) to set the touch sensor to a state of optimum performance (360). This may include resetting the accuracy of the touch sensor to a particular standard which may affect tracking, sensitivity, and/or resolution. Any useful calibration method can be used and are known by those of ordinary skill in the art. Once the calibration process is complete (360), the touch sensor is returned to the normal mode of operation (370).

One of the many benefits of the calibration process described in method 300 includes performing the calibration process at a time when a user is least likely to use the input device. For example, a user may power on their mouse to quickly check a website or document in a rush and there may not be an opportunity for the mouse (e.g., input device) to remain still (e.g., no input data) to allow an uninterrupted calibration process. The method 300 takes advantage of periods of time that a user may not be using the input device 140 to perform the calibration operation. In some embodiments, the calibration method 300 is only performed once after the initial power up. In some cases, the calibration method 300 may be performed after particularly long periods of use (e.g., after 5 hours of use), or after a soft power up (e.g., input device 140 switches from a low power state to a normal power state).

It should be appreciated that the specific steps illustrated in FIG. 3 provide a particular method of calibration, according to an embodiment of the present invention. Other sequences of steps may also be performed according to alternative embodiments. For example, alternative embodiments of the present invention may perform the calibration in a different order or with a different predetermined period of time. To illustrate, the calibration process may occur if no user inputs are detected within a predetermined period of time after power up. In other words, the normal mode of operation may be skipped if no user input is detected after power up, thus performing the calibration process more efficiently. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 300.

Figure 4:
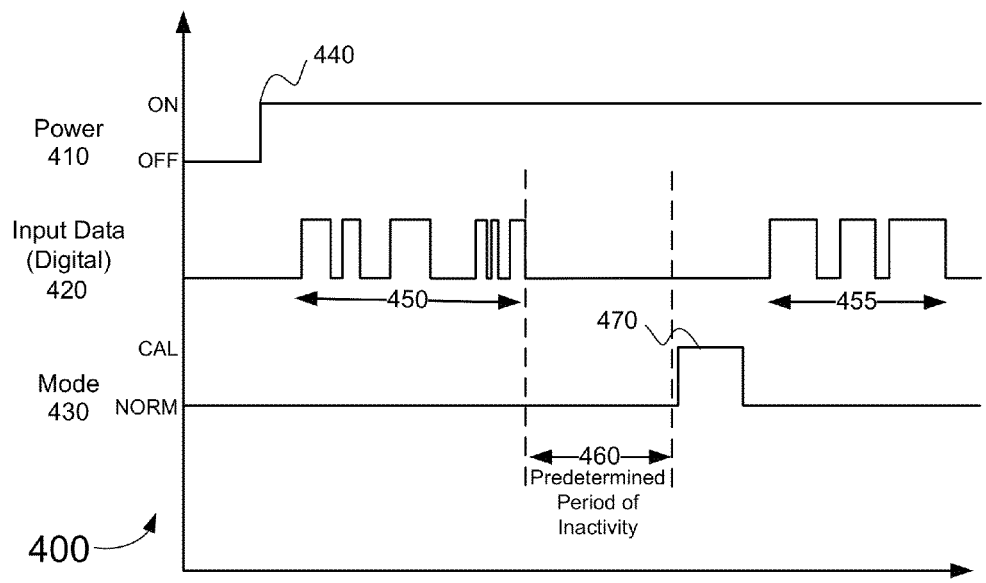
FIG. 4 is a simplified signal diagram illustrating aspects of a method of calibrating an input device according to an embodiment of the invention.

FIG. 4 is a simplified signal diagram 400 illustrating aspects of a method of calibrating an input device according to an embodiment of the invention. To maintain the accuracy of the touch sensor of input device 140, the touch sensor can be periodically calibrated. Calibration can be performed at any time, however this may interfere with the input data stream of the input device 140. For example, calibrating the input device 140 during heavy use (e.g., gaming) can interfere with the user's gaming experience. As such, certain embodiments of the present invention are configured to calibrate the touch sensor of the input device 140 during a period of time that a user may be less likely to be using it. The control device 210 can determine a period of non-use by utilizing sensor fusion, or scanning some or all input sensors on the input device to detect any user inputs (e.g., movement, touch gestures, etc.).

Referring to FIG. 4, the signal diagram 400 includes the input device power signal 410, the input data signal 420 and the mode signal 430. The power signal 410 switches the input device 140 from an "off" state to an operation state, or "on" state at 440. In some embodiments, the "on" state can mean that the input device 140 is fully powered including all system control blocks (e.g., communications system 250, movement tracking 240, etc.). In other embodiments, the "on" state can mean that at least the control circuit 210 and touch detection block 260 are powered up to perform the calibration method described herein. Alternatively, the input device 140 can be in a low power state when in the "on" position. For example, the touch detection system 260 may scan the touch sensor at a reduced frequency due to inactivity for a period of time (e.g., no input device 140 movement, touch sensor input, etc.). Similarly, the off state can be a completely off state (i.e., all components are powered down), or a soft off state (i.e., there is still some activity).

Input data 420 illustrates input data to the input device 140. The input data 420 can come from any input sensor on the input device 140 including the movement tracking system 240, touch detection system 260, accelerometers 220, gyroscopes 230, or other input signal. Although FIG. 4 depicts one input data signal, the input data signal 420 can include a plurality of data signals from multiple sensors and multiple types of input signals (e.g., analog or digital). Input data 420 depicts a first burst of digital data 450 and a second burst of digital data 455. At the end of the data stream 450, a certain period of time passes before the next data stream 455 begins. After a predetermined period of inactivity 460 between data burst 450 and data burst 455, the control circuit 210 changes the mode 430 of the touch sensor from a normal mode of operation to a calibration mode of operation (470). As described above, in addition to touch sensor activity, period of inactivity 460 includes input signals from movement detection, button presses, accelerometer input, and any other input signal of the input device 140. The predetermined period of inactivity can be any suitable period of time where no input activity is detected. In certain embodiments, the predetermined period of inactivity is 30 seconds. Alternatively, the predetermined period of activity can be longer or shorter as required (e.g., 10 seconds, 1 minute, etc.). During the calibration mode of operation, the touch sensor is recalibrated. Touch sensor calibration can be performed a variety of ways that would be appreciated by one of ordinary skill in the art. After calibration is complete, the control circuit 210 switches the mode 430 back from the calibration mode to the normal mode of operation. If a user input (input data 420) is detected during a calibration period, the control circuit 210 can switch back from the calibration mode to the normal mode of operation to process the input data 420 and perform the calibration operation after another predetermined period of activity. Alternatively, the control circuit 210 can complete the calibration process and queue the input data (e.g., buffer the input data 420) until the calibration process is complete. In further embodiments, the control circuit 210 can ignore the input data 420 until the calibration process is complete. Typically, the calibration process is fast enough to not be noticed by a user.

Spurious Signal Detection

During normal use of an input device 140, certain events or conditions may occur that cause unintended or spurious signals with undesirable effects. For example, a user may want to reposition an input device on a mouse pad by lifting and moving the device to more convenient position. A user can move a conventional mouse with mechanical buttons very easily with confidence that input signals are not being generated (e.g., users avoid touching the visible locations of the mechanical buttons, avoid gripping with enough pressure to activate a mechanical button, etc.). These visual cues may not be present on a touch device, and pressure may not influence whether a touch is registered. To prevent unintended input gestures on the touch sensor, certain embodiments of the present invention are configured to alter touch sensor input gesture thresholds during certain conditions including lift conditions, velocity thresholds, and input gestures during a button press on the input device 140. A lift condition can occur when a user picks up the input device 140. A velocity condition can occur when a user moves the input device 140 more than a predetermined velocity. A button press plus gesture occurs when a user simultaneously presses a button and makes an input gesture on the touch sensor. By increasing the input gesture detection thresholds during these conditions, it may be more likely that the input gestures are deliberate, legitimate, and intended, rather than unintentionally executed.

Figure 5A:
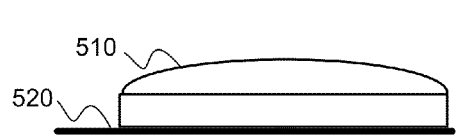
FIG. 5A is a simplified diagram illustrating aspects of a mode of operation for the input device according to an embodiment of the invention.
Figure 5B:
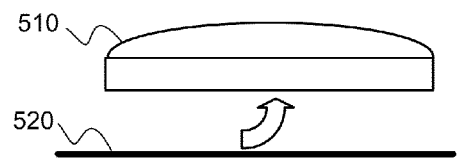
FIG. 5B is a simplified diagram illustrating aspects of spurious signal detection on the input device according to an embodiment of the invention.

FIGS. 5A and 5B are simplified diagrams illustrating aspects of a mode of operation for the input device 510, according to an embodiment of the invention. FIG. 5A depicts the input device 510 resting on a surface 520 (e.g., work surface, table, platform, etc.). FIG. 5B depicts the input device 520 lifted off of the surface 520. The control circuit 210, in conjunction with one or more input sensors, can detect a lift condition (i.e., lift detection). For example, an optical sensor (e.g., movement sensor), gyroscope, accelerometer, or other sensor can be used to determine when the input device 510 has been lifted off of the surface 520. Once a lift condition is detected, the control circuit 210 replaces a default set of input gesture thresholds for the touch sensor to a second set of input gesture thresholds. In some embodiments, the second set of input gesture thresholds requires a larger or more pronounced signal to initiate a given function. For example, a swipe gesture on the touch sensor may require a specific signal magnitude or minimum movement to initiate a swipe gesture (e.g., for panning images, scrolling, etc.). During lift detection, the swipe gesture may require an increased signal magnitude or larger minimum movement to initiate the swipe gesture to help increase the probability that an input gesture made during a lift condition is intentional and not caused by an unintentional touch, brush of clothing, or the like.

Figure 5C:
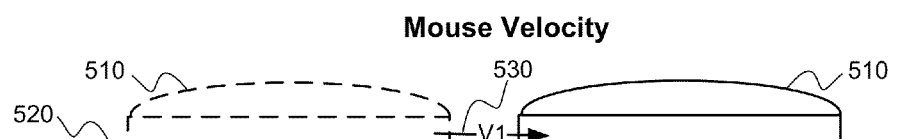
FIG. 5C is a simplified diagram illustrating aspects of spurious signal detection on the input device according to an embodiment of the invention.
Figure 5D:
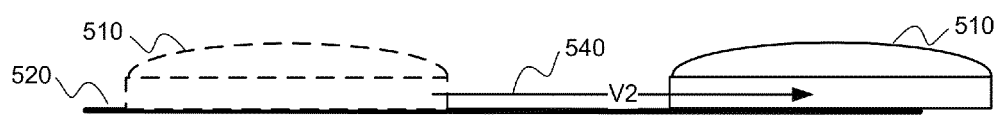
FIG. 5D is a simplified diagram illustrating aspects of spurious signal detection on the input device according to an embodiment of the invention.

FIGS. 5C and 5D are simplified diagrams illustrating aspects of a mode of operation for the input device 510, according to an embodiment of the invention. FIG. 5C depicts the input device 510 moving on a surface 520 from point 515 to point 525 at velocity V1 (530). FIG. 5D depicts the input device 510 moving on a surface 520 from point 515 to point 525 at velocity V2 (540). A user may move an input device 510 and simultaneously execute a gesture on a touch sensor. This may occur, for example, when a user is moving a cursor by moving the input device 510 and swiping the touch sensor (e.g., to scroll a web page). While the input device 510 is moving at a velocity below a predetermined speed threshold (e.g., V1 530), the control circuit 210 applies a first gesture threshold to that particular input gesture. While the input device 510 is moving at a velocity at or above a predetermined speed threshold (e.g., V1 540), the control circuit 210 applies a second gesture threshold to that particular input gesture. In some embodiments, the predetermined speed threshold is 1.5 inches/sec. It should be noted that the predetermined speed threshold can be set to any desired value. In some alternative embodiments, there may be multiple predetermined speed thresholds with multiple gesture thresholds.

Figure 5E:
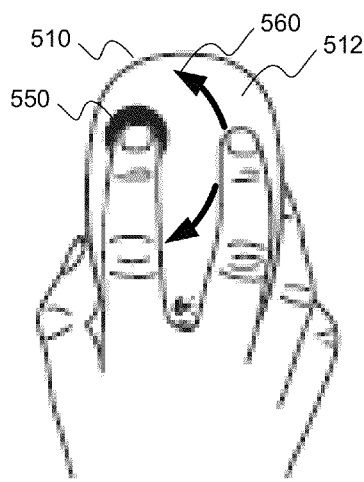
FIG. 5E is a simplified diagram illustrating aspects of spurious signal detection on the input device according to an embodiment of the invention.

FIG. 5E is a simplified diagram illustrating aspects of a mode of operation for the input device 510, according to an embodiment of the invention. FIG. 5E includes an input device 510 and a touch sensor 512 and depicts a simultaneous button press gesture 550 and a swipe gesture 560. It should be noted that touch sensor 512 is shown as covering the entire top surface of input device 510. Other embodiments can have touch sensors that only cover portions of the top surface of input device 510 in any preferable configuration or coverage. Under default conditions (e.g., no lift, no button pressed), a processor (e.g., control circuit) assigns a default gesture threshold value to each available gesture on the touch sensor. In some embodiments, when a user performs a button press gesture (e.g., depressing a physical button, triggering a pressure sensor, or gesturing a button press on the touch sensor, etc.), the processor assigns a second threshold value (e.g., two times the default value) to each of the available gestures on the touch sensor. In some embodiments, only certain gestures may be assigned the second threshold value. It should be noted that only one touch sensor 512 is shown in FIG. 5E, the input device 140 can include multiple touch sensors (not shown) of varying sizes, areas, and locations as required. It should be noted that the first (e.g., default) and second threshold values described herein can be assigned any suitable value as would be appreciated by one of ordinary skill in the art with the benefit of this disclosure.

A button press can be detected in a variety of ways. In some cases, the input device detects a button press by mechanical means (e.g., physical button, switch, micro-switch, etc.), by one or more pressure sensors, by a touch sensor signal, or by any combination thereof. For example, a touch sensor may detect two input signals where the control circuit 210 recognizes a first input signal as a button press based on its size or shape characteristics, and the second input signal as a gesture. Any method of button press detection may be used (e.g., accelerometers), any of which can be configured to cause the control circuit 210 to assign the second threshold value to each of the available gestures on the touch sensor.

Figure 6:
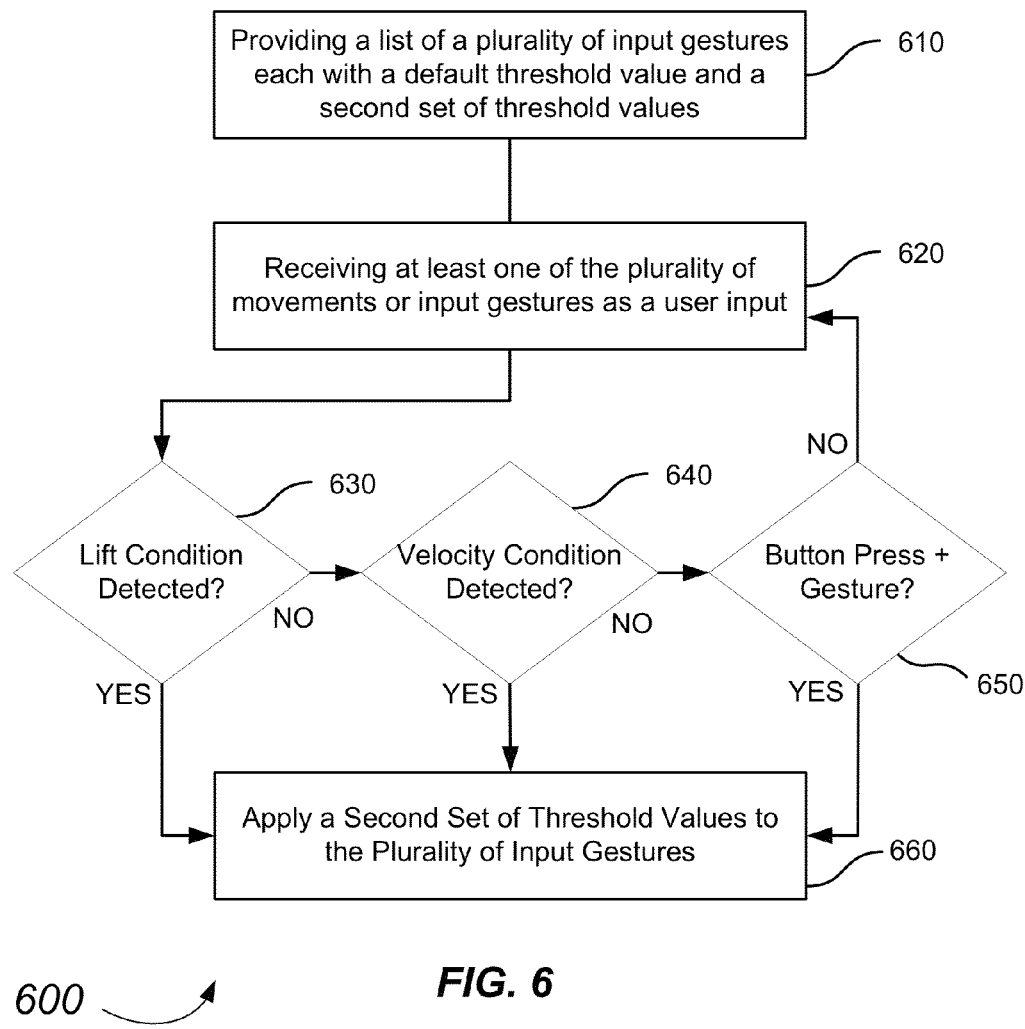
FIG. 6 is a simplified flow diagram illustrating aspects of a method of spurious signal detection on the input device according to an embodiment of the invention.

FIG. 6 is a simplified flow diagram illustrating aspects of a method 600 of spurious signal detection on the input device according to an embodiment of the invention. The method 600 is performed by processing logic that may comprise hardware (e.g., circuitry, dedicate logic, etc.), software (which as is run on a general purpose computing system or a dedicated machine), firmware (embedded software, or any combination thereof. In one embodiment, the method 900 is performed by system 200 of FIG. 2. In another embodiment, the input device 510 includes a processor (e.g., control circuit 210) and a computer readable storage medium coupled to the processor where the computer readable storage medium comprises code executable by the processor for implementing the method 600.

Referring to FIG. 6, the method 600 of spurious signal detection includes providing a list of a plurality of input gestures each with a default threshold value and a second set of threshold values (610). In certain embodiments, the default threshold value is the gesture input signal threshold value to be identified as a particular gesture. For example, a swipe gesture may require a particular movement characteristic and signal magnitude to qualify as a swipe gesture under normal operating conditions. The threshold requirement helps ensure that inadvertent or unintended signals (e.g., a sleeve brushing the touch sensor, resting a finger on the touch sensor, etc.) are not interpreted as input gestures. The second set of threshold values are gesture input signal threshold values required when the input device 510 is in a predetermined condition (e.g., lift detection, velocity threshold detection, button plus gesture detection, etc.). The second set of threshold values helps to ensure that touch sensor input gestures performed during one or more of the predetermined conditions are intentional and not the result of inadvertent movements or touches, which may be more likely to occur.

The method 600 further includes receiving at least one of the plurality of movements or input gestures as a user input (620). Some movements or input gestures can include moving the input device 510 (e.g., x-y-z axis movements) and/or detecting touch gestures on the touch sensor(s). At 630, the control circuit 210 determines whether the user input causes a lift condition. A lift condition occurs when the input device 510 is lifted off of a surface (e.g., in the z-direction). In certain embodiments, a lift condition can be detected by various movement detection sensors (e.g., optical sensor, accelerometer, gyroscope, etc.). If a lift condition is detected, the control circuit 210 applies a second set of threshold values to the plurality of input gestures on the touch sensor (660). In some embodiments, the second set of threshold values can be twice the magnitude of the first set (e.g., default set) of threshold values. It should be noted that each threshold value of both the first and second set of threshold values can be set to any desired value and each threshold value of the second set of threshold values may not necessarily be larger in magnitude than each threshold value of the first set of threshold values. If a lift condition is not detected (630), the control circuit determines if the input signal meets or exceeds a velocity condition (640). As described above with respect to FIGS. 5c-5d, the control circuit 210 detects a velocity condition when the speed or velocity of the input device 510 meets or exceeds a predetermined velocity. In certain embodiments, the predetermined velocity is 1.5 inches/sec. The velocity condition detection helps screen out unintentional input gestures that may occur when the input device 510 is accidentally bumped, knocked over, or other scenario that would likely cause a relatively high velocity and unintended input touch gesture. If a velocity condition is detected, the control circuit 210 applies a second set of threshold values to the plurality of input gestures on the touch sensor (660). In some embodiments, the second set of threshold values can be twice the magnitude of the first set (e.g., default set) of threshold values. It should be noted that each threshold value of both the first and second set of threshold values can be set to any desired value and each threshold value of the second set of threshold values may not necessarily be larger in magnitude than each threshold value of the first set of threshold values.

Referring back to FIG. 6, if a velocity condition is not detected (640), the control circuit 210 determines if the input signal includes a simultaneous button press and gesture input (650). The button plus gesture detection helps screen out unintentional input gestures that may occur when a user is pressing a button. For example, while pressing a button, a user may inadvertently touch another portion of the touch sensor and execute an unintended input gesture. One method of reducing the number of unintentional gesture inputs may include increasing the gesture input thresholds on the touch sensor during one of the predetermined conditions. At 660, if a simultaneous button and input gesture is detected on the touch sensor, the control circuit 210 applies the second set of threshold values to the plurality of input gestures on the touch sensor. In some embodiments, the second set of threshold values can be twice the magnitude of the first set (e.g., default set) of threshold values. It should be noted that each threshold value of both the first and second set of threshold values can be set to any desired value and each threshold value of the second set of threshold values may not necessarily be larger in magnitude than each threshold value of the first set of threshold values. If a simultaneous button press and additional input gesture is not detected on the touch sensor, then the method 600 returns to (620), receives another input gesture as a user input, and once again begins the screening process for a predetermined condition (630-650).

It should be appreciated that the specific steps illustrated in FIG. 6 provide a particular method of spurious signal detection, according to an embodiment of the present invention. Other sequences of steps may also be performed according to alternative embodiments. For example, alternative embodiments may perform the spurious signal detection in a different order or with more or fewer predetermined conditions. For example, the method 600 may detect for the predetermined conditions in a different order, at the same time, or any other sequence for a particular application. Furthermore, there may be other predetermined conditions that can cause a processor (e.g., control circuit 210) to apply the second set of threshold values to the plurality of input gestures (e.g., while running certain software applications, etc.). Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variation, modifications, and alternatives of the method 600.

Rocking Finger Detection

Figure 7A:
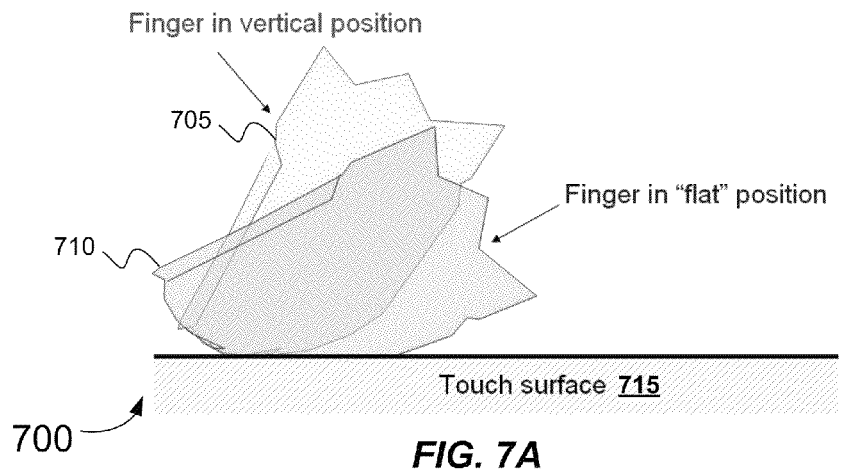
FIG. 7A is a simplified diagram illustrating aspects of a mode of detecting a rocking finger on an input device according to an embodiment of the invention.

FIG. 7A is a simplified diagram 700 illustrating aspects of a mode of detecting a rocking finger on an input device, according to an embodiment of the invention. The diagram 700 includes a finger shown in positions 705 and 710 placed on a touch surface 715 (i.e., touch sensor) of an input device. Position 705 depicts the finger in a first position contacting the touch sensor 715 with a finger tip. The same finger is depicted at 710 in a second position, or "flat" position, contacting the touch sensor over a larger surface area of the finger. This shift from position 705 to 710 (or vice versa) is known as a rocking finger condition. To further illustrate this condition, a finger can be "rocking" when a user's finger is resting on a the touch sensor of a mouse and the mouse is simultaneously pulled towards the user. As the mouse moves, the user's finger stays in contact with the mouse and rolls forward. A rocking finger condition may occur in other ways and should not be limited to the scenarios described herein. It should be noted that although a finger is described herein, other touch objects may be used in conjunction with the touch surface. Other touch objects that may exhibit "rocking" conditions may include stylus pens, palms, and other touch object that would be known by those of ordinary skill in the art.

Figure 7B:
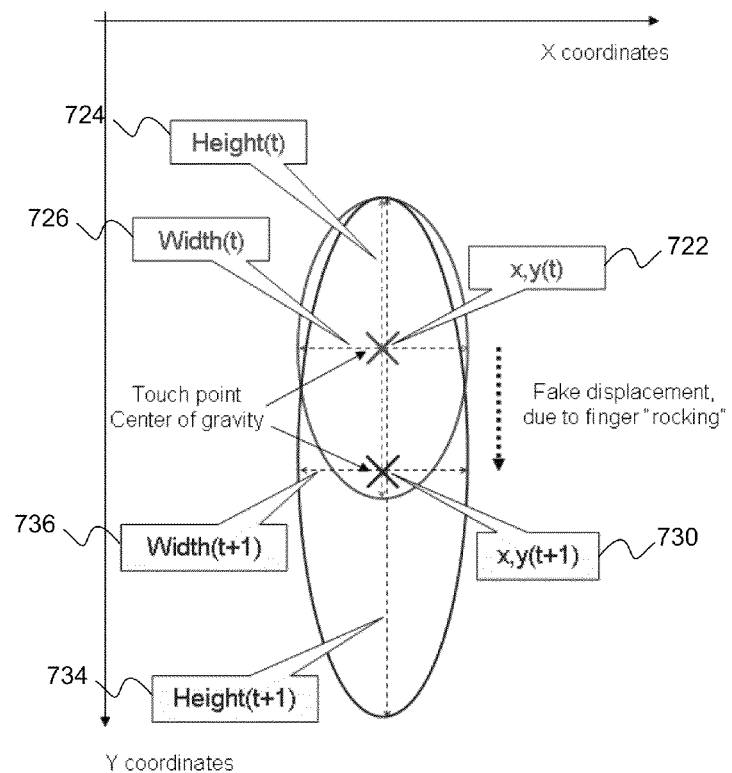
FIG. 7B is a simplified diagram illustrating aspects of a mode of detecting a rocking finger on an input device according to an embodiment of the invention.

FIG. 7B is a simplified diagram 720 illustrating aspects of a mode of detecting a rocking finger on an input device, according to an embodiment of the invention. FIG. 7B depicts a center of mass coordinate 722, height coordinate 724 and width coordinate 726 for a finger in a first position 705 at a first time. FIG. 7B further includes a center of mass coordinate 730, height coordinate 734 and width coordinate 736 for the same finger in the flat position 710 at a second time, where the second time occurs after the first time. In one embodiment, a touch object (e.g., finger) is tracked by determining the location of the center of mass for the finger based on the measured height and width of that touch object on a touch sensor 715. By tracking the movement of the center of mass, a "fake" or unintended finger displacement may be detected on the touch sensor. For example, a control circuit 210 may determine that the finger moved from center of mass 722 to center of mass 730 when, in fact, a rocking condition occurred and the fingertip remained in the same location.

Figure 7C:
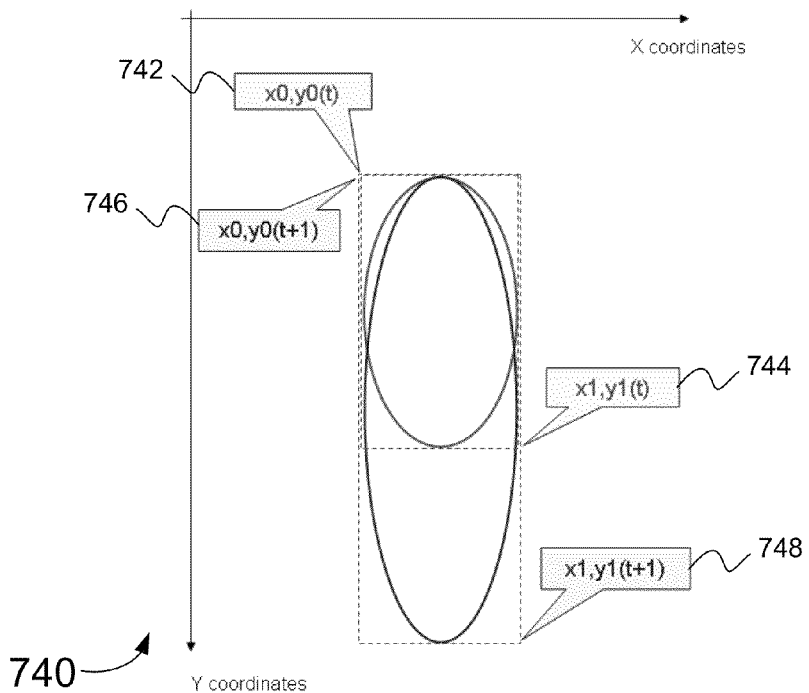
FIG. 7C is a simplified diagram illustrating aspects of a mode of detecting a rocking finger on an input device according to an embodiment of the invention.

FIG. 7C is a simplified diagram 740 illustrating aspects of a mode of detecting a rocking finger on an input device, according to an embodiment of the invention. FIG. 7C depicts a first coordinate 742 (e.g., x0,y0(t)) and second coordinate 744 (e.g., x1,y1(t)) for a finger in the first position 705 at a first time (e.g., "t"). FIG. 7C further includes a third coordinate 746 (e.g., x0,y0(t+1)) and fourth coordinate 748 (e.g., x1,y1(t+1)) for the same finger in the second position, or "flat position" 710 at a second time (e.g., "t+1"), where the second time occurs after the first time. In certain embodiments, the first position (705) coordinates 742 and 744 on the touch sensor 715 provide a rectangular approximation of the touch signal initiated by the finger at time t. Furthermore, the flat position (710) coordinates 746 and 748 on the touch sensor 715 provide a rectangular approximation of the touch signal initiated by the finger at time t+1. The rectangular approximations identify opposite-ended, diagonal end points of a rectangle that closely encompasses the touch signal on the touch sensor 715. By determining the position of the finger using the coordinate based approach of FIG. 7C instead of the center-of-mass based approach of FIG. 7B, a rocking finger condition can be accurately detected, as described below in FIGS. 8a and 8b. It should be noted that other alternative shapes can be used to approximate a touch sensor signal. For example, instead of the rectangular coordinate-based approach described above, a circular coordinate-based approach could be used utilizing a center point and diameter where each end point of the diameter is used to determine if a rocking condition occurred. Furthermore, additional sampling points may be used (e.g., t, t+1, t+2, . . . t+N). In some embodiments, the touch sensor 715 can be similar to the touch sensor 512 of FIG. 5E.

Figure 7D:
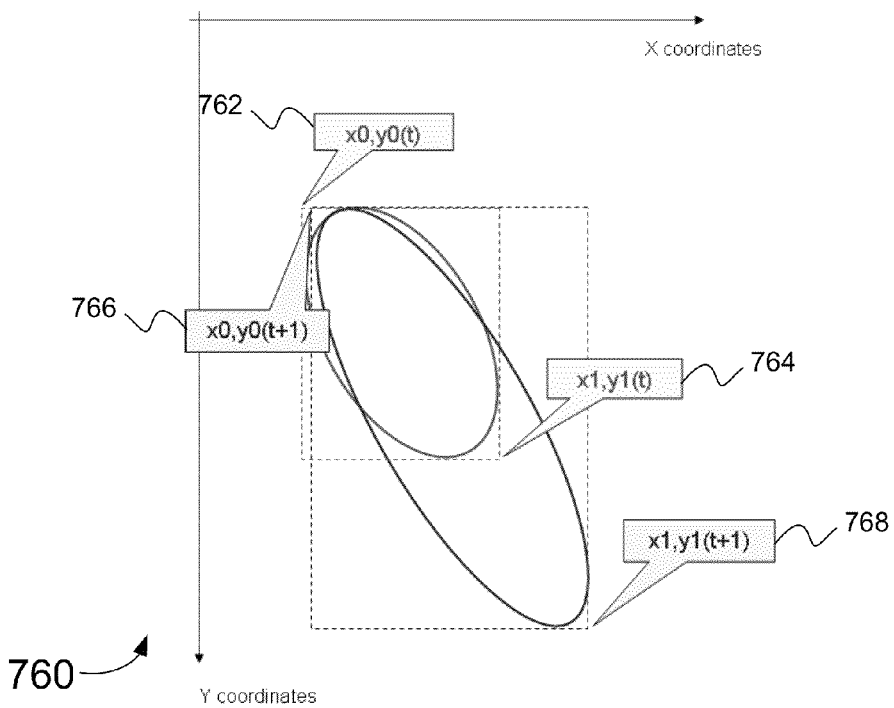
FIG. 7D is a simplified diagram illustrating aspects of a mode of detecting a rocking finger on an input device according to an embodiment of the invention.

FIG. 7D is a simplified diagram 760 illustrating aspects of a mode of detecting a rocking finger on an input device, according to an embodiment of the invention. FIG. 7D is a similar depiction as FIG. 7C with the finger's position oriented in a diagonal configuration. Despite the different orientation, the methods described herein work substantially the same for any orientation and does not require the finger to be aligned vertically (e.g., as shown in FIG. 7C) to successfully detect a rocking finger condition. Referring to FIG. 7D, the diagram 760 depicts a first coordinate 762 (e.g., x0,y0(t)) and second coordinate 764 (e.g., x1,y1(t)) for a finger in the first position 705 at a first time (e.g., "t"). FIG. 7D further includes a third coordinate 766 (e.g., x0,y0(t+1)) and fourth coordinate 768 (e.g., x1,y1(t+1)) for the same finger in the second position, or "flat" position" 710 at a second time (e.g., "t+1"), where the second time occurs after the first time. In certain embodiments, the first position (705) coordinates 762 and 764 on the touch sensor 715 provide a rectangular approximation of the touch signal initiated by the finger at time t. Furthermore, the flat position (710) coordinates 766 and 768 on the touch sensor 715 provide a rectangular approximation of the touch signal initiated by the finger at time t+1. The rectangular approximations identify opposite-ended, diagonal end points of a rectangle that closely encompasses the touch signal on the touch sensor 715. By determining the position of the finger using the coordinate based approach of FIGS. 7C and 7D, instead of the center-of-mass based approach of FIG. 7B, a rocking finger condition can be accurately detected, as described below in FIGS. 8a and 8b.

Figure 8A:
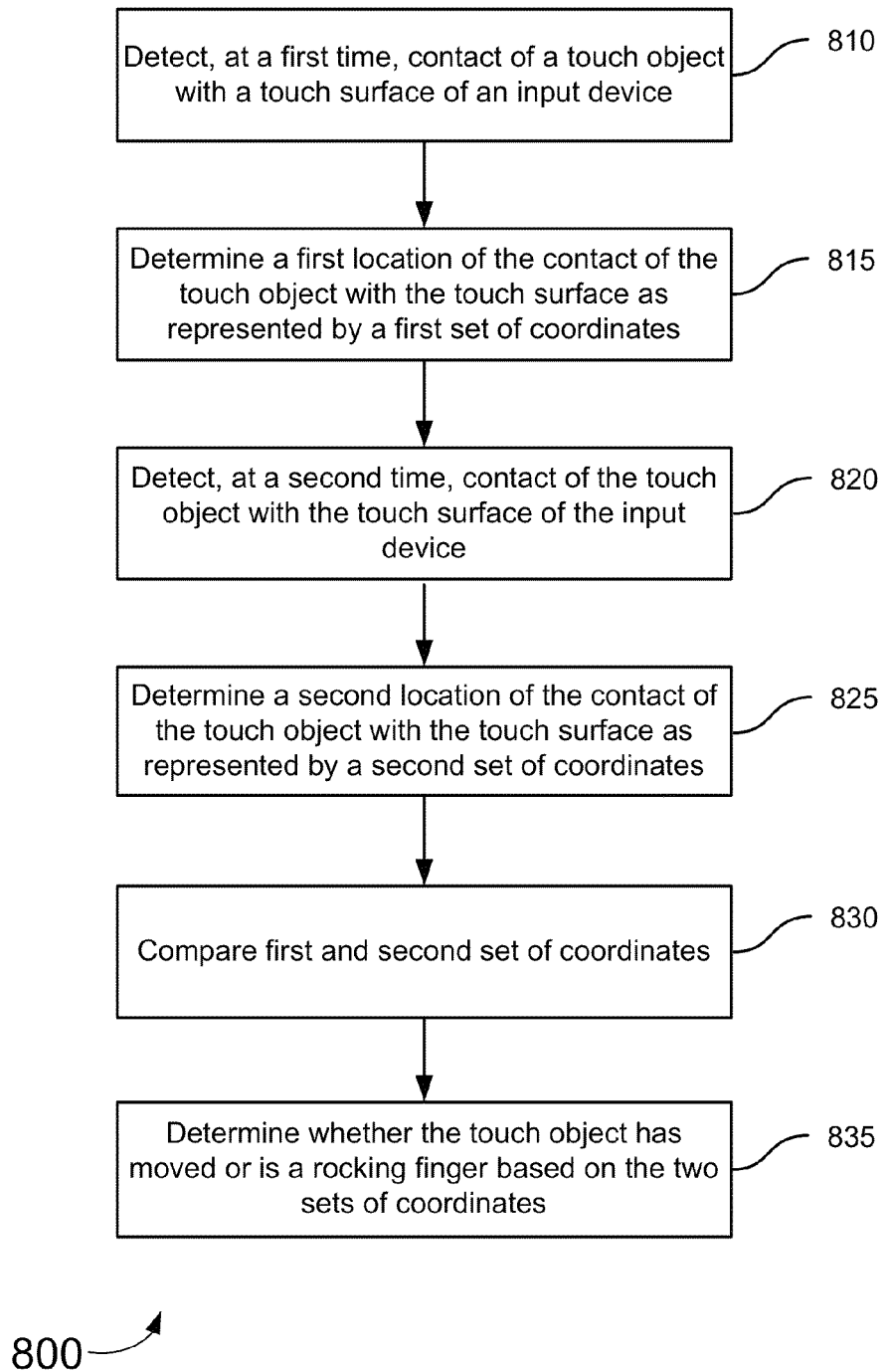
FIG. 8A is a simplified flow diagram illustrating aspects of a method of detecting a rocking finger on an input device according to an embodiment of the invention.

FIG. 8A is a simplified flow diagram illustrating aspects of a method 800 of detecting a rocking finger on an input device, according to an embodiment of the invention. The method 800 is performed by processing logic that may comprise hardware (e.g., circuitry, dedicate logic, etc.), software (which as is run on a general purpose computing system or a dedicated machine), firmware (embedded software, or any combination thereof). In one embodiment, the method 800 is performed by system 200 of FIG. 2. In another embodiment, the touch surface 715 of the input device (not shown) includes a processor (e.g., control circuit 210) and a computer readable storage medium coupled to the processor where the computer readable storage medium comprises code executable by the processor for implementing the method 800.

Referring to FIG. 8A, the method 800 includes detecting, at a first time (e.g., t0) a contact of a touch object (e.g., finger) with a touch sensor 715 of an input device (810). The control circuit 210 determines a first location of the contact of the touch object with the touch sensor as represented by a first set of coordinates (815). Referring to FIG. 7C, the first set of coordinates can include first coordinate 742 and second coordinate 744, which represent a rectangular approximation of the touch signal 741. The method 800 further includes detecting, at a second time (t+1), a contact of the touch object with the touch sensor of the input device (820). The control circuit 210 determines a second location of the contact of the touch object with the touch sensor as represented by a second set of coordinates (825). Referring to FIG. 7C, the second set of coordinates can include third coordinate 746 and fourth coordinate 748, which represent a rectangular approximation of the touch signal 745. In one embodiment, the second time occurs approximately 16 ms after the first time. Alternatively, other time intervals between the first (t0) and second times (t+1) can be used as required. At 830, the control circuit 210 compares the first and second set of coordinates and determines whether the touch object has moved or is a rocking finger based on the two sets of coordinates (835). The comparison between the two sets of coordinates is further discussed below with respect to FIG. 8B. In some cases, the time (t) can be referred to as (t0).

It should be appreciated that the specific steps illustrated in FIG. 8A provide a particular method of rocking finger detection, according to an embodiment of the present invention. Other sequences of steps may also be performed according to alternative embodiments. For example, alternative embodiments may perform the rocking finger method in a different order or with more or fewer predetermined conditions. For example, the method 800 may detect touch signals in a different order or other sequence for a particular application. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 800.

Figure 8B:
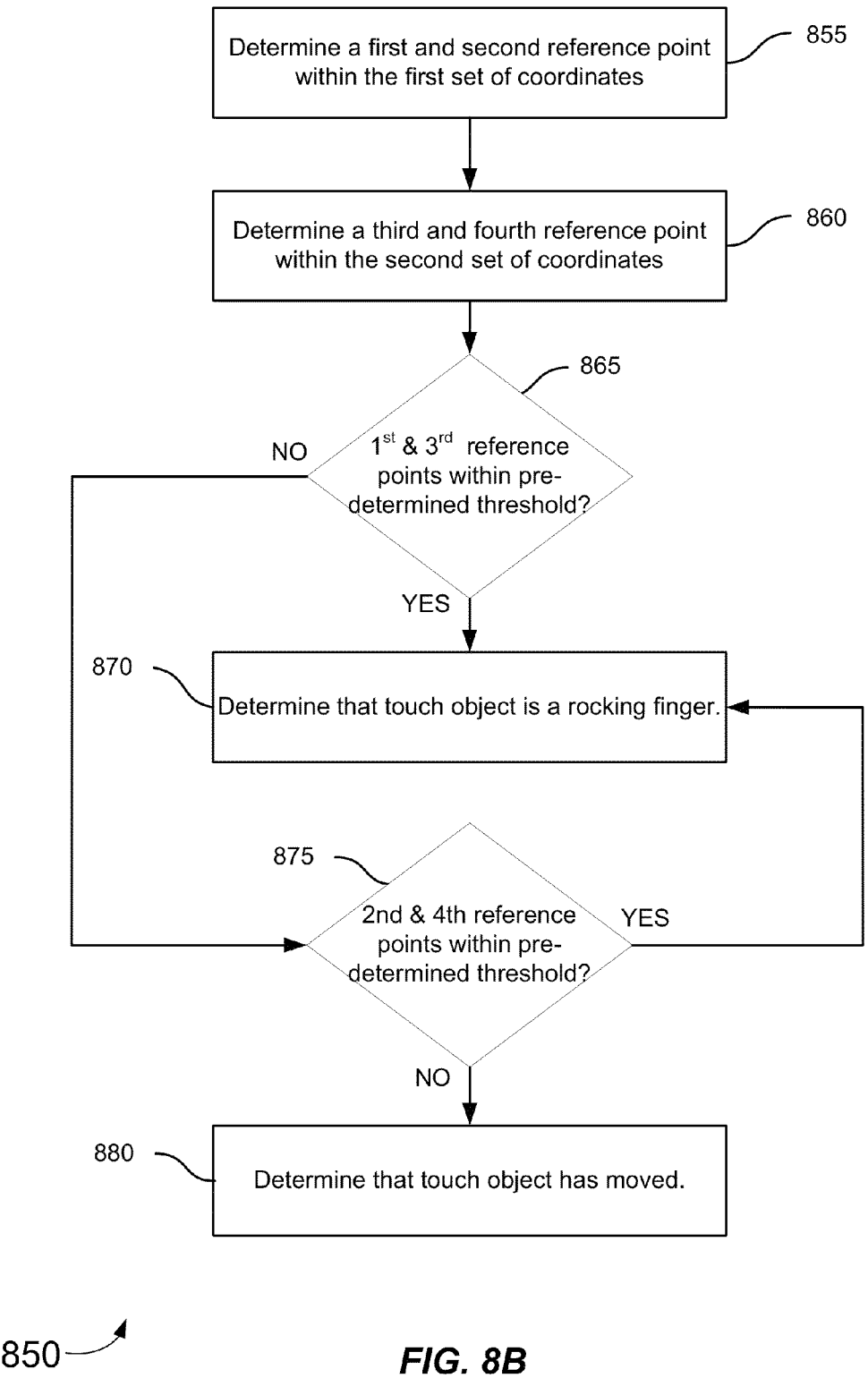
FIG. 8B is a simplified flow diagram illustrating aspects of a method of detecting a rocking finger on an input device according to an embodiment of the invention.

FIG. 8B is a simplified flow diagram illustrating aspects of a method 850 of detecting a rocking finger on an input device, according to an embodiment of the invention. The method 850 is performed by processing logic that may comprise hardware (e.g., circuitry, dedicate logic, etc.), software (which as is run on a general purpose computing system or a dedicated machine), firmware (embedded software, or any combination thereof). In one embodiment, the method 800 is performed by system 200 of FIG. 2. In another embodiment, the touch surface 715 of the input device (not shown) includes a processor (e.g., control circuit 210) and a computer readable storage medium coupled to the processor where the computer readable storage medium comprises code executable by the processor for implementing the method 850.

Referring to FIG. 8B, the method 850 includes determining a first and second reference point within the first set of coordinates (855). Referring to FIG. 7C, the first and second reference points are 742 (x0,y0(t)) and 744 (x1,y1(t)). The method 850 further includes determining a third and fourth reference point within the second set of coordinates. Referring to FIG. 7C, the third and fourth reference points are 746 (x0,y0(t+1)) and 748 (x1,y1(t+1)), respectively. At 865, the control circuit compares the position of the first (x0,y0(t)) and third reference points (x0,y0(t+1)) to determine if they are within a predetermined threshold (e.g., a predetermined distance) from one another. As described above, the rocking finger condition occurs when a user touches a touch sensor with a finger tip and subsequently rests a larger or smaller portion of the finger on the touch sensor without substantially moving the finger tip (see supra at FIG. 7A). The predetermined distance between the location of the presence of the finger tip on the touch sensor at time (t) versus the location of the presence of the finger tip on the touch sensor at time (t+1) can vary by design. Typically, the predetermined distance between the first and third reference point is a small enough threshold to accurately distinguish between a rocking finger condition and an intentional movement of a finger tip, but large enough to accommodate slight shifts in the position of the finger tip that may occur during a rocking finger condition. In certain embodiments, the predetermined threshold can require that the position of the fingertip at (t) be within a 1 cm radius of the position of the fingertip at (t+1). It should be noted that other threshold distances or shapes can be used. For example, the predetermined threshold can be determined by a set of square coordinates around the location of the finger tip at (t0), and the like.

If the first and third reference points are within the predetermined threshold from one another (e.g., within a certain distance), the control circuit 210 determines that a rocking finger condition has occurred (870). As described above, the rocking finger detection can affect the position of a cursor, a parametric value, and the like. For example, if a cursor is at a particular position on a monitor (e.g., monitor 120) and a rocking finger condition is detected, no displacement of the cursor occurs despite a shift in the center of mass of the finger on touch sensor 715 since the fingertip did not substantially move between time (t) and (t+1).

If the first and third reference points are not within the predetermined threshold from one another, the control circuit 210, the control circuit compares the position of the second (x1,y1(t)) and fourth reference points (x1,y1(t+1)) to determine if they are within a second predetermined threshold (e.g., a predetermined distance) from one another (875). If the second and fourth reference points are within the second predetermined threshold from one another, the control circuit 210 determines that a rocking finger condition has occurred (870). The second predetermined threshold for the second and fourth reference points can be the same or different than the first predetermined threshold for the first and third reference points, as required. The optimal predetermined threshold for each set of reference points would be known by one of ordinary skill in the art with the benefit of this disclosure. If the second and fourth reference points are not within the predetermined threshold from one another, then the control circuit 210 determines that the finger (e.g., touch object) has moved. As described above, the rocking finger detection can effect the position of a cursor, a parametric value, and the like. For example, if a cursor is at a particular position on a monitor (e.g., monitor 120) and no rocking finger condition is detected, then normal displacement of the cursor occurs, as would be known or appreciated by one of ordinary skill in the art.

It should be appreciated that the specific steps illustrated in FIG. 8B provide a particular method of rocking finger detection, according to an embodiment of the present invention. Other sequences of steps may also be performed according to alternative embodiments. For example, alternative embodiments may only compare the first and third reference points and forego comparing the position of the second and fourth reference points in determining a rocking finger condition. Other embodiments may compare the second and fourth reference points and forego comparing the first and third reference points. In certain embodiments, the method 800 may perform the individual steps in a different order, at the same time, or any other sequence for a particular application. Moreover, the individual steps illustrated in FIG. 8B may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 800.

Power Management

In some embodiments, a touch pad (touch sensor) will remain in an active state while a finger or other touch object (e.g., stylus, palm, etc.) remains on a touch surface of the touch pad. Typically, the active state of a touch pad includes sampling the touch pad surface for inputs at a high enough sampling rate to ensure a predetermined accuracy and resolution. For example, high sampling rates can detect fast or subtle finger movements better than slower sampling rates. However, higher sampling rates typically require more power than slower rates. As such, some embodiments may reduce the sampling rate when no finger is detected on or near the touch pad. Other embodiments described herein utilize reduced sampling rates on the touch sensor, even when a finger is detected on the touch sensor provided that no finger movement is detected for a predetermined period of time. This configuration can further reduce the overall power dissipation of an input device and improve power efficiency.

Figure 9A:
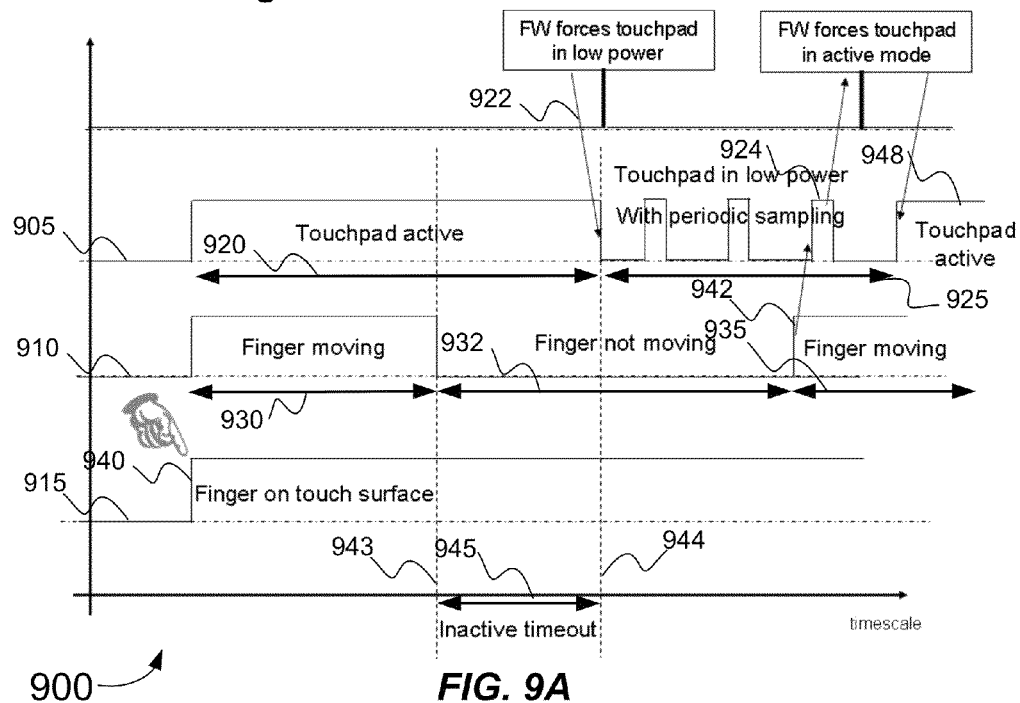
FIG. 9A is a simplified signal diagram illustrating aspects of a mode of power management on a touch sensor, according to an embodiment of the invention.

FIG. 9A is a simplified signal diagram 900 illustrating aspects of a method of reducing the power consumption of a touch sensor, according to an embodiment of the invention. The diagram includes a touchpad signal 905, a finger movement signal 910 ("signal 910"), and a signal representing a finger on the touch surface 915 ("signal 915"). In certain embodiments, the touchpad signal 905 is the scanning rate (e.g. sampling rate) at which a processor (e.g., control circuit 210) scans the active area of the touch sensor to determine if there is contact or presence of a touch object (e.g., finger, stylus, etc.). The touchpad signal 905 further includes a touchpad active period 920 and a low power mode 925 featuring periodic sampling of the touch sensor 715. The finger movement signal 910 includes a first period indicating finger movement (930), a period indicating no finger movement (980), and a second period indicating finger movement 935. A finger is detected on the touch surface (touch sensor) at 940 of signal 915. Interval 945 is an inactivity timeout period where no finger movement is detected. In some embodiments, the touch surface (i.e., touch sensor) described herein can be similar to the touch sensor 715 of FIG. 7A.

In certain embodiments, the control circuit 210 will reduce the sampling rate of the touchpad when no finger movement is detected for a period of time, even if the finger is still detected on the touch surface. To illustrate, a finger is detected at 940 of signal 915. In some embodiments, finger detection can include both finger contact or finger presence (e.g., the finger is in close proximity to the touch surface). As shown, the finger remains on the touch surface throughout the rest of signal 915. The touchpad signal 915 remains active during the finger movement period 930 of signal 910. At 943, the finger movement signal 910 changes from a finger moving period 930 to a static finger condition 932 (i.e., finger not substantially moving). The static finger condition is further discussed below with respect to FIG. 9B. After a predetermined inactivity timeout period 945, the control circuit 210 switches the touch pad from the active touchpad state (interval 920) to a lower power state (interval 925 starting at 944) utilizing periodic touchpad sampling. The touchpad remains in this state, despite the presence of the finger on the touch surface (signal 915). The second finger movement period 935 begins at 942. The finger movement is detected at the next periodic pulse of the touchpad sample period at 924. The control circuit 210 returns to the touchpad active state in response to detecting finger movement at 948. The signal diagram 900 is further described below with respect to FIG. 10.

Figure 9B:
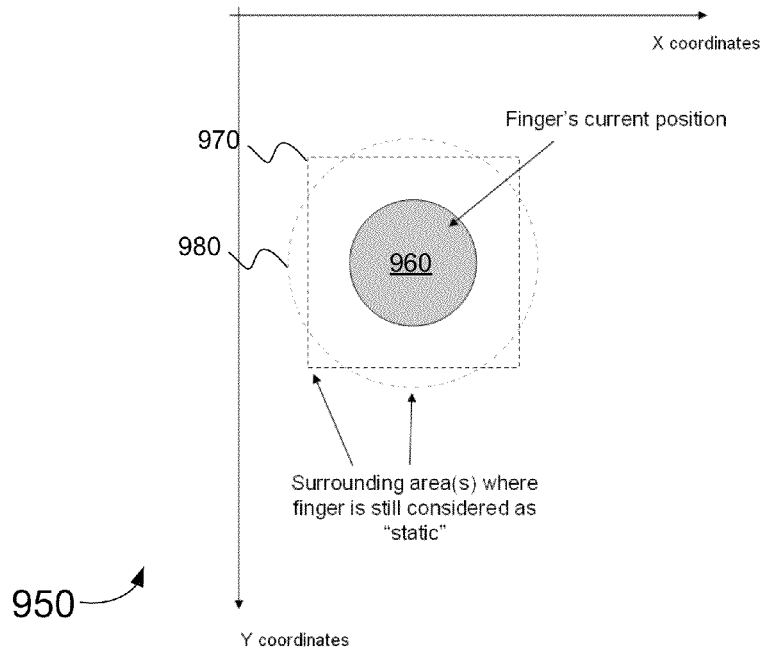
FIG. 9B is a simplified diagram illustrating aspects of a mode of power management on a touch sensor, according to an embodiment of the invention.

FIG. 9B is a simplified diagram 950 illustrating aspects of a mode of power management on an input device, according to an embodiment of the invention. Diagram 950 depicts a touch signal 960 on a touch pad 715, a first static threshold ("boundary") 970 and a second static threshold ("boundary") 980 on an X-Y coordinate plane. As described above with respect to FIG. 9A, certain embodiments utilize a low power state after a certain period of inactivity on a touch sensor (e.g., touch pad), even with a static finger present on the touch sensor. A finger is considered "static" if a touch is detected on the touch sensor, but does not move outside of a predetermined area or position on the touch sensor. Two examples of a predetermined area are boundaries 970 (square shaped) and 980 (circular). In some cases, circular predetermined areas are centered over the center of mass of the touch signal and of a certain radius selected for a desired static finger detection threshold. In other cases, rectangular (e.g., or square shaped) predetermined areas are centered over the center of mass of the touch signal and of a certain height and width selected for a desired static finger detection threshold. Certain embodiments use both boundaries 970, 980 (superimposed over each other), in determining whether a touch signal is a static signal. Other embodiments can use only one boundary (970 or 980) or more than two boundaries. Further embodiments may utilize multiple power levels corresponding to multiple boundaries. For example, one embodiment can use three concentric circular boundaries (not shown) where touch signals on each consecutively larger boundary results in a step-wise or graduated increase in power dissipation (e.g., increased sampling rates) until a non-static condition (active mode) is reached outside of the last concentric circular boundary.

Figure 10:
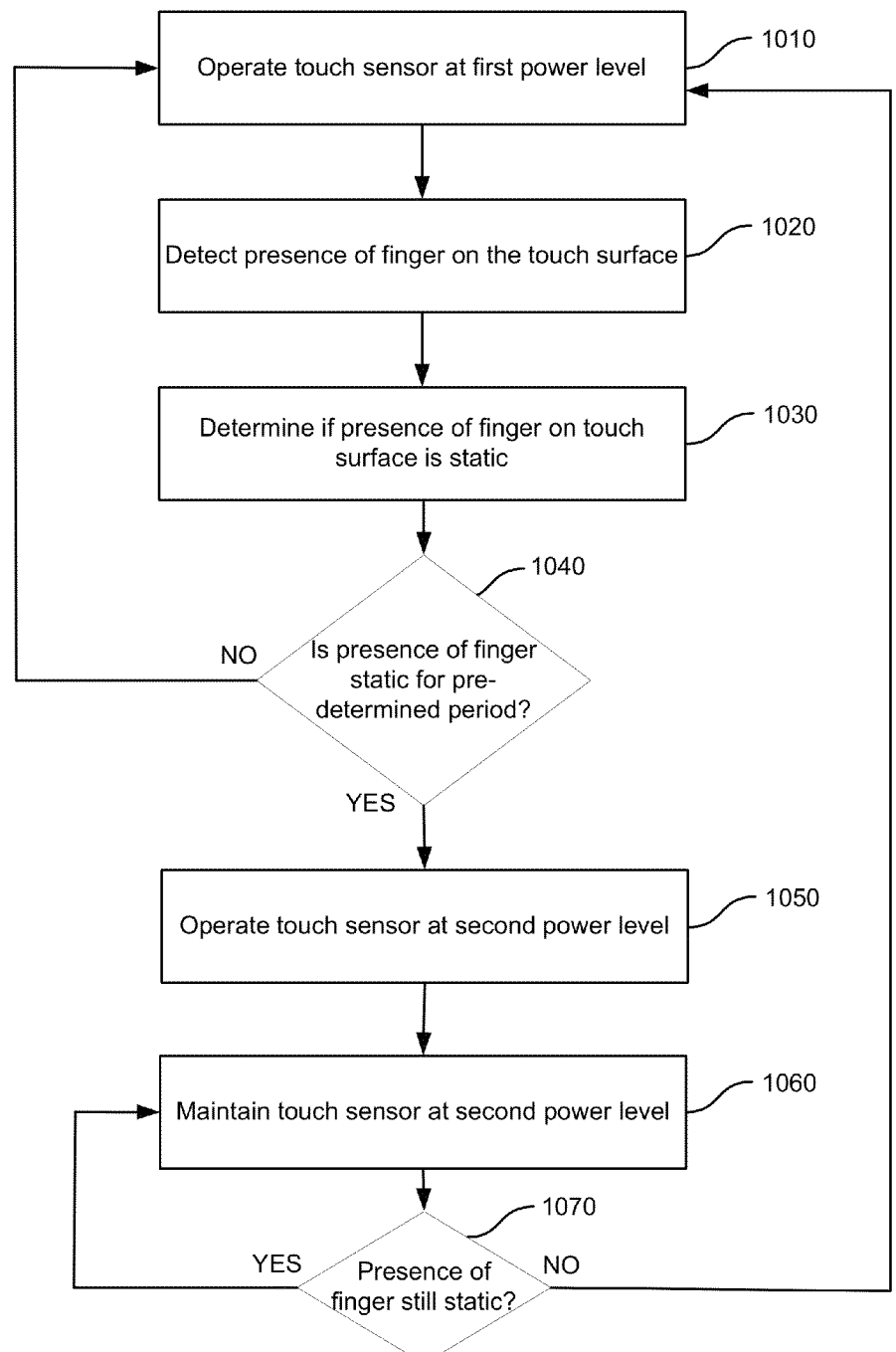
FIG. 10 is a simplified flow diagram illustrating aspects of a method of power management on a touch sensor, according to an embodiment of the invention.

FIG. 10 is a simplified flow diagram illustrating aspects of a method of power management on a touch sensor, according to an embodiment of the invention. The method 1000 is performed by processing logic that may comprise hardware (e.g., circuitry, dedicate logic, etc.), software (which as is run on a general purpose computing system or a dedicated machine), firmware (embedded software, or any combination thereof). In one embodiment, the method 1000 is performed by system 200 of FIG. 2. In another embodiment, the touch sensor of the input device (e.g., touch sensor 512 of input device 510) includes a processor (e.g., control circuit 210) and a computer readable storage medium coupled to the processor where the computer readable storage medium comprises code executable by the processor for implementing the method 1000.

Referring to FIG. 10, the method 1000 includes the control circuit 210 operating the touch sensor at a first power level. In some embodiments, the first power level is a default power level where the input device 140 is in an active state. Typically, the active state includes a sufficiently high touch sensor sampling rate to support a desired input accuracy and resolution. At 1020, the input device detects the presence of a finger (touch signal 960) on the touch surface (e.g., touch sensor 512). At 1030, the control circuit 210 determines if the presence of the finger on the touch surface is static based on the location of the touch signal 960. As discussed above with respect to FIG. 9B, a touch signal 960 or position of a finger is static if it is on or near the touch sensor, but stays within a predetermined area 970 and/or 980. If the touch signal 960 is not static (1040) for a predetermined period (inactive timeout period 945 of FIG. 9A), the method returns to (1010) and maintains operation of the touch sensor 512 at the first power level.

If the touch signal 960 is static (stays within boundaries 970 and/or 980) for at least a predetermined period (inactive timeout period 945), the control circuit 210 operates the touch sensor (e.g., touchpad) at a second power level (1050). In some embodiments, the second power level has a lower power dissipation than the first power level, however other power configurations can be used. As described above with respect to FIG. 9A, the second power level can be achieved by utilizing a reduced scanning rate (e.g., a periodic, non-continuous scan) for the touch sensor. The control circuit 210 maintains the touch sensor at the second power level (1060) and, in one embodiment, does not change until the control circuit 210 detects finger movement outside of the predetermined area (e.g., 970, 980), or, in other words, a static finger condition is no longer detected (1070). Once the presence of the finger on the touch sensor (e.g., touch signal) is no longer static (1070), the control circuit 210 returns operation of the touch sensor to the first power level 1010. In alternative embodiments, multiple power levels may be used to improve the power efficiency of the touch sensor. For example, longer periods of inactivity may activate power levels with lower periodic scanning rates and lower power dissipation. In some embodiments, when the presence of a finger (static or otherwise) is no longer detected, the method 1000 ends. In some cases, once a finger is no longer detected, the power returns to the first power level. Alternatively, other power management schemes may apply when no touch object is present on the touch sensor.

It should be appreciated that the specific steps illustrated in FIG. 10 provide a particular method of power management, according to an embodiment of the present invention. Other sequences of steps may also be performed according to alternative embodiments. For example, alternative embodiments may be different for predetermined inactivity thresholds, different power schemes, etc. In certain embodiments, the method 1000 may perform the individual steps in a different order, at the same time, or any other sequence for a particular application. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 1000.

It should be noted that certain embodiments of the present invention can perform some or all of the functions described herein. For example, some embodiments can perform all of the functions described in FIGS. 1-10, while others may be limited to one or two of the various functions described herein.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of improving an accuracy of touch detection on an input device, the method comprising:
   detecting, at a first time, contact of a finger with a touch surface of the input device;
   determining a first location of the contact of the finger with the touch surface, wherein the first location is represented as a first set of coordinates on a two-dimensional plane, wherein the first set of coordinates form corners of a first rectangle, and wherein the first set of coordinates identify an approximation of a length and width of the first location of the contact of the finger with the touch surface;
   detecting, at a second time, contact of the finger with the touch surface of the input device, the second time occurring after the first time;
   determining a second location of the contact of the finger with the touch surface, wherein the second location is represented as a second set of coordinates on the two dimensional plane, wherein the second set of coordinates form corners of a second rectangle, and wherein the second set of coordinates identify an approximation of a length and width of the second location of the contact of the finger with the touch surface;
   comparing the first set of coordinates with the second set of coordinates, wherein comparing the first set of coordinates with the second set of coordinates includes:
      determining a first reference point and a second reference point within the first set of coordinates, wherein the first reference point and the second reference point are diagonally opposed from each other; and
      determining a third reference point and a fourth reference point within the second set of coordinates, wherein the third reference point and the fourth reference point are diagonally opposed from each other;
   determining that the finger is rocking if the first reference point of the first set of coordinates and the third reference point of the second set of coordinates are within a predetermined distance from one another; and
   determining that the finger has moved if the first reference point of the first set of coordinates and the third reference point of the second set of coordinates are greater than a predetermined distance from one another.

2. The method of claim 1, wherein the finger can move relative to the touch surface or rock in a generally stationary position.

3. The method of claim 1 wherein the two-dimensional plane is an X-Y plane.

4. The method of claim 1 further comprising determining that the finger is rocking if the second reference point of the first set of coordinates and the fourth reference point of the second set of coordinates are within a predetermined distance from one another.

5. A non-transitory computer-readable storage medium comprising a plurality of non-transitory computer-readable instructions tangibly embodied on the computer-readable storage medium, which, when executed by a data processor, provides a method of improving an accuracy of touch detection on a touch sensor on an input device, the plurality of instructions comprising:
   instructions that cause the data processor to detect, at a first time, contact of a touch object with a touch surface of the input device;
   instructions that cause the data processor to determine a first location of the contact of the touch object with the touch surface, wherein the first location is represented as a first set of coordinates on a two-dimensional plane, wherein the first set of coordinates form corners of a first rectangle, and wherein the first set of coordinates identify an approximation of a length and width of the first location of the contact of the touch object with the touch surface;
   instructions that cause the data processor to detect, at a second time, contact of the touch object with the touch surface of the input device, the second time occurring after the first time;
   instructions that cause the data processor to determine a second location of the contact of the touch object with the touch surface, wherein the second location is represented as a second set of coordinates on the two dimensional plane, wherein the second set of coordinates form corners of a second rectangle and wherein the second set of coordinates identify an approximation of a length and width of the second location of the contact of the touch object with the touch surface;

instructions that cause the data processor to compare the first set of coordinates with the second set of coordinates, wherein the instructions that cause the data processor to compare the first set of coordinates with the second set of coordinates includes:
  instructions that cause the data processor to determine a first reference point and a second reference point within the first set of coordinates, wherein the first reference point and the second reference point are diagonally opposed from each other; and
  instructions that cause the data processor to determine a third reference point and a fourth reference point within the second set of coordinates, wherein the third reference point and the fourth reference point are diagonally opposed from each other;
instructions that cause the data processor to determine that the touch object is rocking if the first reference point of the first set of coordinates and the third reference point of the second set of coordinates are within a predetermined distance from one another; and
instructions that cause the data processor to determine that the touch object has moved if the first reference point of the first set of coordinates and the third reference point of the second set of coordinates are greater than predetermined distance from one another.

6. The non-transitory computer-readable storage medium of claim 5 wherein the touch object is a finger, wherein the finger can move relative to the touch surface or rock in a generally stationary position.

7. The non-transitory computer-readable storage medium of claim 5 wherein the two-dimensional plane is an X-Y plane.

8. The non-transitory computer-readable storage medium of claim 5 further comprising instructions that cause the data processor to determine that the touch object is rocking if the second reference point of the first set of coordinates and the fourth reference point of the second set of coordinates are within a predetermined distance from one another.

9. A method of reducing the power consumption of an input device, the method comprising:
  detecting the presence of a touch object on a touch surface of the input device;
  operating the input device at a first power level in response to detecting the presence of the touch object on the touch surface;
  determining that the presence of the touch object on the touch surface is static for a predetermined period of time, wherein the touch object is static if the touch object remains in contact with the touch surface and its movement remains within a predetermined region for the predetermined period of time;
  operating the input device at a second power level in response to determining that the presence of the touch object on the touch surface is static;
  maintaining the input device at the second power level;
  determining that the presence of the touch object on the touch surface is not static; and
  operating the input device at the first power level.

10. The method of claim 9 wherein the touch object is a finger.

11. The method of claim 9 wherein the predetermined region is an area centered around the presence of the touch object on the touch surface.

12. The method of claim 11 wherein the area centered around the presence of the touch object on the touch surface is circular and of a predetermined radius.

13. The method of claim 11 wherein the area centered around the presence of the touch object on the touch surface is rectangular and of a predetermined height and width.

14. The method of claim 11 wherein the area centered around the presence of the touch object on the touch surface includes a circular area and rectangular area superimposed upon each other, wherein the circular area is of a predetermined radius and the rectangular area is of a predetermined height and width.

15. The method of claim 9 wherein the second power level is a lower power than the first power level.

16. The method of claim 9 wherein the method is performed by firmware controlled by a processor.

17. A non-transitory computer-readable storage medium comprising a plurality of non-transitory computer-readable instructions tangibly embodied on the computer-readable storage medium, which, when executed by a data processor, provides a method of reducing the power consumption of an input device, the plurality of instructions comprising:
  instructions that cause the data processor to detect the presence of a touch object on a touch surface of the input device;
  instructions that cause the data processor to operate the input device at a first power level in response to detecting the presence of the touch object on the touch surface;
  instructions that cause the data processor to determine that the presence of the touch object on the touch surface is static for a predetermined period of time, wherein the touch object is static if the touch object remains in contact with the touch surface and its movement remains within a predetermined region for the predetermined period of time;
  instructions that cause the data processor to operate the input device at a second power level in response to determining that the presence of the touch object on the touch surface is static;
  instructions that cause the data processor to maintain the input device at the second power level;
  instructions that cause the data processor to determine that the presence of the touch object on the touch surface is not static; and
  instructions that cause the data processor to operate the input device at the first power level.

18. The non-transitory computer-readable storage medium of claim 17 wherein the touch object is a finger.

19. The non-transitory computer-readable storage medium of claim 17 wherein the predetermined region is an area centered around the presence of the touch object on the touch surface.

20. The non-transitory computer-readable storage medium of claim 19 wherein the area centered around the presence of the touch object on the touch surface is circular and of a predetermined radius.

21. The non-transitory computer-readable storage medium of claim 19 wherein the area centered around the presence of the touch object on the touch surface is rectangular and of a predetermined height and width.

22. The non-transitory computer-readable storage medium of claim 19 wherein the area centered around the presence of the touch object on the touch surface includes a circular area and rectangular area superimposed upon each other, wherein the circular area is of a predetermined radius and the rectangular area is of a predetermined height and width.

23. The non-transitory computer-readable storage medium of claim 17 wherein the second power level is a lower power than the first power level.

24. The non-transitory computer-readable storage medium of claim 17 wherein the method is performed by firmware controlled by a processor.

\* \* \* \* \*